United States Patent [19]
McCabe

[11] Patent Number: 6,030,179
[45] Date of Patent: *Feb. 29, 2000

[54] AIRFOIL STRUCTURES AND METHOD

[76] Inventor: Francis J. McCabe, #6 Bunker Hill Rd., Ottsville, Pa. 18942

[*] Notice: This patent is subject to a terminal disclaimer.

[21] Appl. No.: 08/990,201

[22] Filed: Dec. 13, 1997

Related U.S. Application Data

[63] Continuation-in-part of application No. 08/685,134, Jul. 24, 1996, Pat. No. 5,711,653, which is a continuation-in-part of application No. 08/507,129, Jul. 31, 1995, Pat. No. 5,599,172.

[51] Int. Cl.[7] ...................................................... F04D 29/38
[52] U.S. Cl. ........................................ 416/237; 416/223 R
[58] Field of Search ................................. 416/223 R, 228, 416/235, 236 R, 237, 197 R, 197 A, 197 B; 244/198, 218

[56] References Cited

U.S. PATENT DOCUMENTS

| | | |
|---|---|---|
| 1,025,428 | 5/1912 | Stanschus . |
| 2,004,853 | 6/1935 | Crary . |
| 3,807,663 | 4/1974 | Bartoe . |
| 3,910,531 | 10/1975 | Leomand . |
| 4,021,135 | 5/1977 | Pedersen et al. . |
| 4,055,950 | 11/1977 | Grossman . |
| 4,075,500 | 2/1978 | Oman et al. . |
| 4,080,100 | 3/1978 | McNeese . |
| 4,132,499 | 1/1979 | Igra . |
| 4,140,433 | 2/1979 | Eckel . |
| 4,143,992 | 3/1979 | Crook . |
| 4,204,799 | 5/1980 | deGeus . |
| 4,236,083 | 11/1980 | Kenney . |
| 4,324,985 | 4/1982 | Oman . |
| 4,447,738 | 5/1984 | Allison . |
| 4,655,122 | 4/1987 | McCabe . |
| 4,720,640 | 1/1988 | Anderson et al. . |
| 4,784,570 | 11/1988 | Bond . |
| 5,332,354 | 7/1994 | Lamont . |
| 5,457,346 | 10/1995 | Blumberg . |
| 5,599,172 | 2/1997 | McCabe . |
| 5,711,653 | 1/1998 | McCabe . |

FOREIGN PATENT DOCUMENTS

| | | |
|---|---|---|
| 365045 | 9/1906 | France . |
| 39960 | 1/1937 | Netherlands . |
| 407633 | 3/1934 | United Kingdom . |
| 643237 | 9/1950 | United Kingdom . |
| 2036193 | 6/1980 | United Kingdom . |
| 2068472 | 8/1981 | United Kingdom . |
| 2175963 | 12/1986 | United Kingdom . |
| 8100286 | 2/1981 | WIPO . |
| 9201866 | 2/1992 | WIPO . |

OTHER PUBLICATIONS

Kentfield & Clavelle, "The Flow Physics of Gurney Flaps, Devices for Improving Turbine Blade Performance," (1993), pp. 24–34, 17 Wind Engineering #1, Brentwood, Essex, GB.

Gurney flap illustrations on automobile chassis, date unknown.

*Primary Examiner*—Christopher Verdier
*Attorney, Agent, or Firm*—Frank J. Benasutti

[57] ABSTRACT

An aerodynamic-shaped airfoil having a cross-section which is essentially an inverted pan-shape with an intermediate section, a leading edge into the wind, and a trailing edge which has a flange doubled back toward the leading edge.

7 Claims, 27 Drawing Sheets

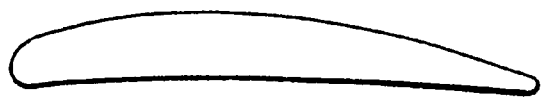
FIG. 1A PRIOR ART
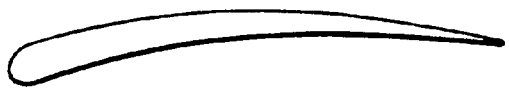
FIG. 1B PRIOR ART
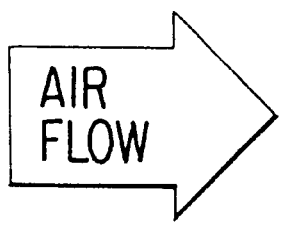 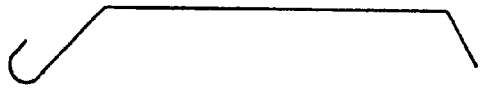
FIG. 1C PRIOR ART
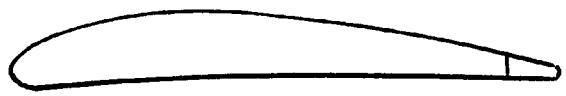
FIG. 1D PRIOR ART

REFLECTION ON THE BERNOULLI STYLE AIRFOIL

NET FORCE FROM LIFT

BERNOULLI

WITHOUT GROUND EFFECT  WITH GROUND EFFECT

TRAILING EDGE LIP
AS APPLIED TO STANDARD AIRFOIL

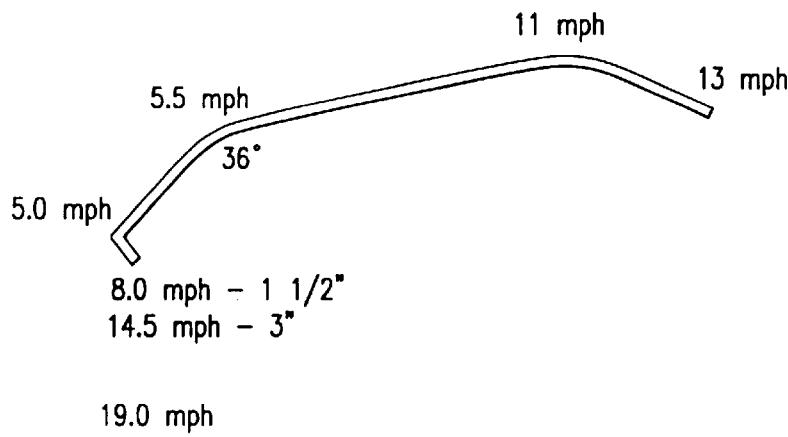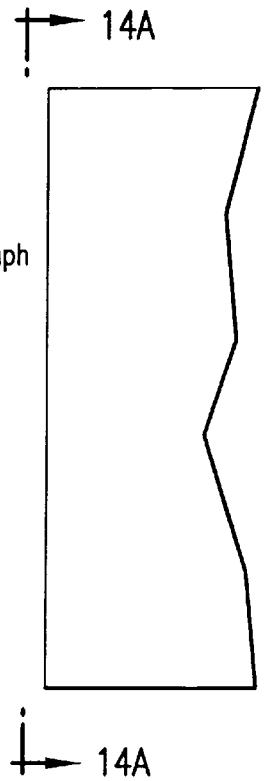
FIG.14
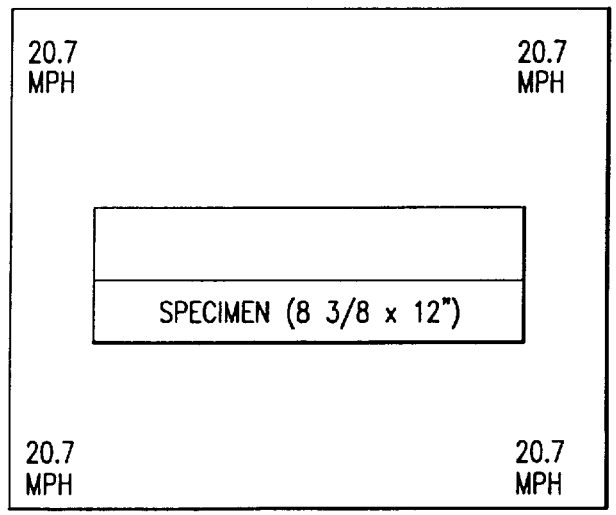
FIG.14A

WIND TUNNEL TEST
OUR 2' TUNNEL - 20 MPH WIND

| CONVENTIONAL McCABE WING #8<br>SCALED DOWN TO 8,345" CHORD LENGTH X 1 FOOT LENGTH (TEST SPECIMEN #6) |
|---|
| ANGLE OF ATTACK-LIFT  15°-1 1/2oz.; 20°-9oz.; 25°-11oz.; 30°-11 1/2oz.; 35°-12oz.: 40°-10oz.; max. 12oz. |

| NEW BIG RADIUS 30°- 30° WING WITH A .300 LIP<br>8,337" CHORD (NOTE: SAME CHORD LENGTH AS #8 BUT LESS TOTAL SURFACE AREA) (TEST SPECIMENT #7Lo) |
|---|
| ANGLE OF ATTACK-LIFT  15°-11oz.; 20°-12oz.; 25°-13 1/2oz.; 30°-13oz.; 35°-11oz.; 40°-9 1/2 oz.; max. 26°-14oz. |

| NEW BIG RADIUS 30°- 30° WING WITH A .391 LIP<br>8,337" CHORD (TEST SPECIMEN #7Lb) |
|---|
| ANGLE OF ATTACK-LIFT 15°-12 1/2oz.; 20°-13 1/2oz.; 25°-14oz.; 30°-13 1/2oz.; 35°-11oz.; 40°-9oz.; max.23°-15oz. |

| NEW BIG RADIUS 30°- 30° WING WITH A .450 LIP<br>8,337" CHORD (TEST SPECIMEN # 7Lc) |
|---|
| ANGLE OF ATTACK-LIFT 15°-11 1/2oz.; 20°-13oz.; 25°-13oz.; 30°-12oz.; 35°-10 1/2oz.; 40°-8oz.; max.28°-14 1/2oz |

| NEW BIG RADIUS 30°- 30° WING WITH A .600 LIP<br>8,337" CHORD (TEST SPECIMEN #7Ld) |
|---|
| ANGLE OF ATTACK-LIFT 15°-11 1/2oz.; 20°-12 1/2 oz.; 25°-13oz.; 30°-12oz.; 35°-10 1/2oz.; 40°-8oz.; max.24°-14oz. |

| NEW BIG RADIUS 30°- 30° WING WITH A .290 LIP<br>Different Chord Length 9,470" scaled (TEST SPECIMEN #9) |
|---|
| ANGLE OF ATTACK-LIFT 15°-11oz.; 20°-13oz.; 25°-15oz; 30°-15oz.; 35°-15oz.; 40°-14oz.; max.15oz. |

NOTES:
1) NACA 0012; 29 -7.5oz. MAX.
2) 8 3/8 x 12" FLATPLATE 7.2 oz. -34° ANGLE OF ATTACK

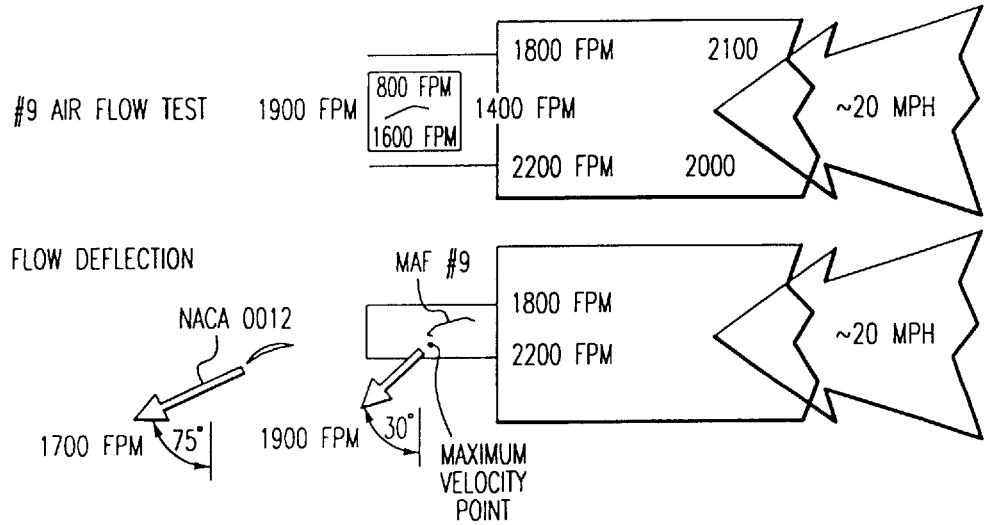

FIG.16

WINDTUNNEL TESTS
COMPARING VARIUS STANDARD AIR FOILS WITH MAF AIR FOIL DESIGNS 3, 4 & 5

| AIR FOIL DESCRIPTION/SHAPE | TEST SPECIMEN # | WIDTH (NOTE: ALL SPECIMENS WERE 12" LONG) | MAX. LIFT ANGLE OF ATTACK | POUND OF LIFT @ ~19 MPH | POUND OF LIFT @ ~30 MPH | REMARKS |
|---|---|---|---|---|---|---|
| ORDINARY AIRFOIL CARVED FROM BALSAWOOD | 1 | 4" | 22° | 0.70 | 1.65 | |
| FAN BLADE AIRFOIL MOLDED PLASTIC | 5 | 4"@TIP 5 1/2"@ROOT | 28°@TIP 43°@ROOT | 0.65 | 1.60 | |
| MAF-3 AIRFOIL ROLL FORMED BDD BLADE | 2 | 4" | 26° | 0.95 | 2.40 | LESS PEAKED LIFT TO ANGLE OF ATTACK CURVE |
| MAF-7 ROUNDED SHORT CHORD 30° ANGLE | 8 | 4 5/8" | 25° | 0.88 | 2.58 | |
| ORDINARY AIRFOIL W/FLAP MODEL AIRPLANE WING SECTION | 3 | 10" | 28° | 1.75 / 1.35 | 2.80 / 2.30 | FLAP DOWN~35° FLAP UP |
| MAF-4 AIRFOIL FORMED FROM 12 GA. ALUM | 4 | 10" | 29° | 1.90 | 3.55 | MUCH FLATTER A OF A CURVE |
| MAF-6 AIRFOIL FORMED FROM 12 GA. ALUM | 6 | 8 3/8" | 32° | 2.00 | 3.80 | ~7 1/2% DEVIATION FROM 25° TO 45° |
| MAF 7 ROUNDED 30° ANGLE | 7 | 8 3/8" | 29° | | 4.00 | WITH SLOTS 4.2#FLAT A OF A CURVE |
| MAF 7 ROUNDED 30° ANGLE WIDE CHORD | 9 | 9" | 32° | | 4.25 | LIFT OVER 4 Lbs. FROM 23° TO 37° ANGLE OF ATTACK |
| NACA 0012 AIRFOIL BALSAWOOD | 10 | 8 3/8" | 24° | | 1.90 | POPULARLY USED ON WINDMILL BLADES |

FIG.17

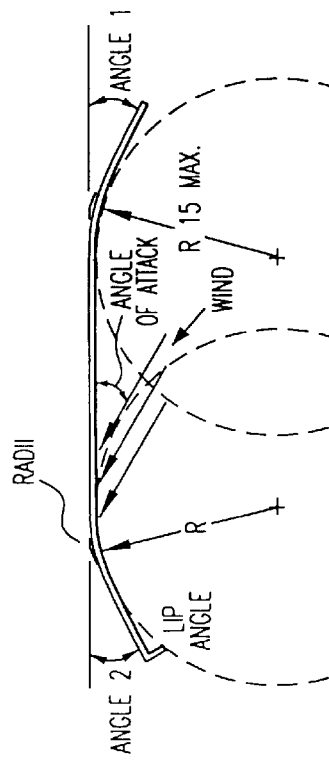

FIG. 19

DEVICE/MEDIUM RELATIONSHIPS
AIR MOVES DEVICE (NEEDS ENDCAPS)
a. MEDIUM THRU DEVICE
  1. WINDMILLS
  2. KITES
  3. SAILS
b. DEVICE THRU MEDIUM
  1. GLIDERS
  2. WINGS
  3. RACECAR AIRFOILS

DEVICE MOVES AIR (ENDCAPS DEGRADE PERF)
a. FOR AIR MOVEMENT
  1. FANS
b. FOR THRUST (BY AIR MASS ACCELERATION)
  1. PROPELLERS
  2. HELICOPTER BLADES
  3. SWAMP BOATS
  4. SELF-LIFTING DEVICES

IN GENERAL, AIR MOVING THE DEVICE IMPLIES A SLOWER APPLICATION, WHILE DEVICES MOVING THE AIR WOULD MEAN A FASTER APPLICATION.

LEADING VANE CREATES RELATIVE WIND ANGLE (1) WHICH:

1) FLATTENS LIFT PEAK OVER A LENGTHENED ANGLE ATTACK RANGE TYPICALLY 15°-35°)
2) SETS MAX LIFT TO ANGLE OF ATTACK @ ANGLE (1).
3) SETS L/D PROFILE TO ANGLE (1) AND ANGLE OF ATTACK
4) A FIXED VANE ALIGNED INTO WIND & BACK AIRFOIL PIVOTING (WOULD MAXIMIZE LIFT WHILE HOLDING MIN. DRAG PROFILE)

DRAWING KEY FOR PHYSICAL DESIGN

| ELEMENT | | WHEN ELEMENT IS... | |
|---|---|---|---|
| LIP 90^ | | SMALLER | LARGER |
| LIP ANGLE | | LARGER | SMALLER |
| 'C' | | SHORTER | LONGER |
| ANGLES 1&2 | | BIGGER | FLATTER |
| RADII | | SHARPER | ROUNDER |
| ROOT RADIUS (FANS) | | NOT DONE | CAN BE SCOOPED |
| 'A' | | SHORTER | LONGER |
| 'B' | | SHORTER | LONGER |
| ANGLE OF ATTACK (WIND) | | SMALL | INCREASE TO PEAK |
| AIRSPEED | | LESS | MORE |
| FWD OUTER TIP RADIUS | | LESS | MORE |
| BLADE ANGLE INTO ROTATION | | LESS | MORE (18^ max. TESTED) |
| BELL MOUTH SHROUD OR PLATE | | | |
| a. FREEFLOW | | OVER BLADE TIPS | BEHIND DOWNSTREAM OF BLADES |
| b. PRESSURE FLOW | | NOT OVER BLADES | (PLATE) OVR TRING EDGE OF BLDS |

WINDTUNNEL TESTS
COMPARING VARIUS STANDARD AIR FOILS WITH MAF AIR FOIL DESIGNS 3,4 & 5

| AIR FOIL DESCRIPTION/SHAPE | TEST SPECIMEN # | WIDTH (NOTE: ALL SPECIMENS WERE 12" LONG) | MAX. LIFT ANGLE OF ATTACK | POUND OF LIFT @ | | REMARKS |
|---|---|---|---|---|---|---|
| | | | | ~19 MPH | ~30 MPH | |
| ORDINARY AIRFOIL CARVED FROM BALSAWOOD | 1 | 4" | 22° | 0.70 | 1.65 | |
| FAN BLADE AIRFOIL MOLDED PLASTIC | 5 | 4" @TIP 5 1/2" @ROOT | 28° @TIP 43° @ROOT | 0.65 | 1.60 | |
| MAF-3 AIRFOIL ROLL FORMED BDD BLADE | 2 | 4" | 26° | 0.95 | 2.40 | LESS PEAKED LIFT TO ANGLE OF ATTACK CURVE |
| MAF-7 ROUNDED TWO 30° ANGLES/20° & 30° ANGLES | 3 | 4 5/8" | 30°/20° | 0.88 | 2.78/2.60 | |
| ORDINARY AIRFOIL W/FLAP MODEL AIRPLANE WING SECTION | 3 | 10" | 28° | 1.75 / 1.35 | 2.80 / 2.30 | FLAP DOWN~35° FLAP UP |
| MAF-4 AIRFOIL FORMED FROM 12 GA. ALUM | 4 | 10" | 29° | 1.90 | 3.55 | |
| MAF-6 AIRFOIL FORMED FROM 12 GA. ALUM | 6 | 8 3/8" | 32° | 2.00 | 3.80 | MUCH FLATTER A OF A CURVE ~7 1/2% DEVIATION FROM 25° TO 45° |
| MAF-7 ROUNDED 30° ANGLE | 7 | 8 3/8" | 29° | | 4.00 | WITH SLOTS 4.2#FLAT A OF A CURVE |
| MAF-7 ROUNDED 30° ANGLE WIDE CHORD | 9 | 9" | 32° | | 4.25 | LIFT OVER 4 Lbs. FROM 23° TO 37° ANGLE OF ATTACK |
| NACA 0012 AIRFOIL BALSAWOOD | 10 | 8 3/8" | 24° | | 1.90 | POPULARITY USED ON WINDMILL BLADES |

FIG.27

AIRFOIL STRUCTURES AND METHOD

CROSS REFERENCE TO RELATED APPLICATIONS

This application is a continuation-in-part of my prior application Ser. No. 08/685,134 filed Jul. 24, 1996, now U.S. Pat. No. 5,711,653 issued Jan. 27, 1998, entitled AIR LIFTED AIRFOIL the disclosure of which is incorporated herein by reference; which was a continuation-in-part of my prior then application Ser. No. 08/507,129 filed Jul. 31, 1995 entitled WIND ENERGY CONVERSION SYSTEM now U.S. Pat. No. 5,599,172 the disclosure of which is also incorporated herein by reference.

TECHNICAL FIELD

This invention relates to improvements in airfoils, and more particularly, to the aerodynamic shape of an airfoil to exhibit improved lift characteristics.

BACKGROUND ART

In the prior art, a wide variety of shapes have been used to harness the power of air. See, for example, the schematic prior art drawings shown in FIGS. 1A–1D. These shapes are designed primarily to act in response to air flowing in the direction of the arrow identified as "air flow" in FIGS. 1–3, impacting upon the angle of attack at which the airfoil blade is mounted, and causing the blade to lift. In a typical airplane wing (airfoil), for example, the angle of attack is such that a negative pressure is created above the wing (blade or airfoil) and the wing rises as the air flows across it.

In my prior art U.S. Pat. No. 4,655,122, I disclosed an improved aerodynamic shape which comprised essentially a planar face portion and leading and trailing edges associated with opposing ends of the face portion in a pan-shaped enclosure shown more particularly in the detailed cross section of FIG. 4 of that patent. This blade was shown in use in an air damper where one or more blades were pivoted for rotation within a frame. In that environment, the blades provided an increased lift when forced to open by escaping air from a structure, and thus this permitted the blades to be constructed of a relatively heavy gauge material without compromising damper efficiency. The air flow patterns and dimensions are also disclosed in detail.

Also in the prior art, it was known to use windmills with air compressor units that are powered by the wind energy turning the windmill, to store air under pressure for use, for example, in generating electricity. See, for example, U.S. Pat. Nos. 4,055,950; 4,236,083 and 4,447,738.

Windmill type designs have also been used in wind turbines with various shaped impeller blades disposed at various angles and encased in a cowling designed to direct the wind over the blades. See, for example, U.S. Pat. Nos. 1,025,428; 4,021,135; 4,140,433; 4,132,499; 4,133,992; 4,324,985 and 4,720,640.

One of the primary goals of the prior art windmill configurations was to get more revolutions per minute (rpm) out of the device at lower wind speeds and more power at similar rpm. Thus, the blade configurations were such as to pass air quickly through the device. To do this, the blades would be so configured and positioned for maximum power and not to interfere with each other's air flow.

One of the problems with prior art windmill devices was that in sustained high winds they would tend to "run away" and burn up. Furthermore, at low winds or intermittent winds, they could not produce the sustained energy, i.e., constant speed, necessary to produce, for example, electricity.

In my work with windmills, I experimented with various shaped blades, such as that disclosed in my U.S. Pat. No. 5,599,172, for a wind energy conversion system. Therein, I disclosed a new wind energy conversion system for particular application to stored energy, such as compressed air. In accordance with my invention, energy was extracted from the air movement at low speeds. The configuration and spacing of the blades and the shaping of the device which supports them was such that there was an interaction between adjacent blades to provide more torque at slower speeds. In accordance with my device, I collected as much air as possible within the device, and thus I collected as much force as possible. Further, the shape, positioning and configuration of the blades within the device tended to prevent it from running away; in other words, there was actually a rotary speed limiting effect.

It became apparent to me that the preferred blade structure had characteristics which were not known in the prior art.

DISCLOSURE OF THE INVENTION

Summary of the Invention

I have invented an aerodynamic-shape for an airfoil comprising a structure having a cross-section shape comprising an intermediary portion and leading and trailing edges associated with opposite edges of the intermediary portion to form an essentially pan-shaped structure in cross-section with convex and concave surfaces; and having a flange extending from the trailing edge back toward the leading edge in the concave area. The leading edge is defined by the edge which is directed into the flow of air.

BRIEF DESCRIPTION OF DRAWINGS

FIGS. 1A–1D are schematic views of various prior art cross-sections of airfoils;

FIG. 14 shows a graphical representation of an airfoil for use in an airfoil wind tunnel test;

FIG. 14A is a view taken as indicated by the lines and arrows A—A in FIG. 14;

FIG. 16 shows the results of the wind tunnel test on various wings with inserts showing air flow test #9 and flow deflection;

FIG. 17 shows the results of wind tunnel tests with depictions of various shapes of airfoils;

FIG. 19 is a graphical representation of a physical design of an airfoil in accordance with my invention;

FIG. 27 is a chart showing the results of various wind tunnel tests; similar to FIG. 17 with different data.

DESCRIPTION OF THE PREFERRED EMBODIMENTS

Figure 2:
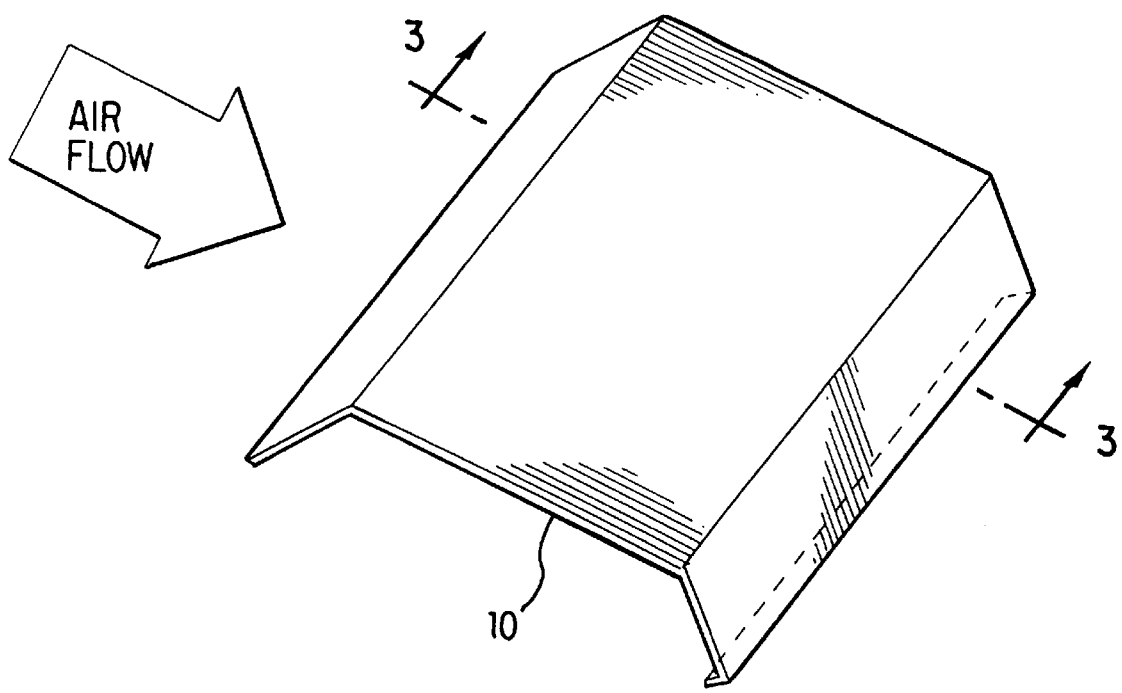
FIG. 2 is a perspective view of the preferred embodiment of my invention.

Referring to the Figures, FIG. 2 shows a perspective view of an airfoil or blade 10 in accordance with my invention.

Figure 3:
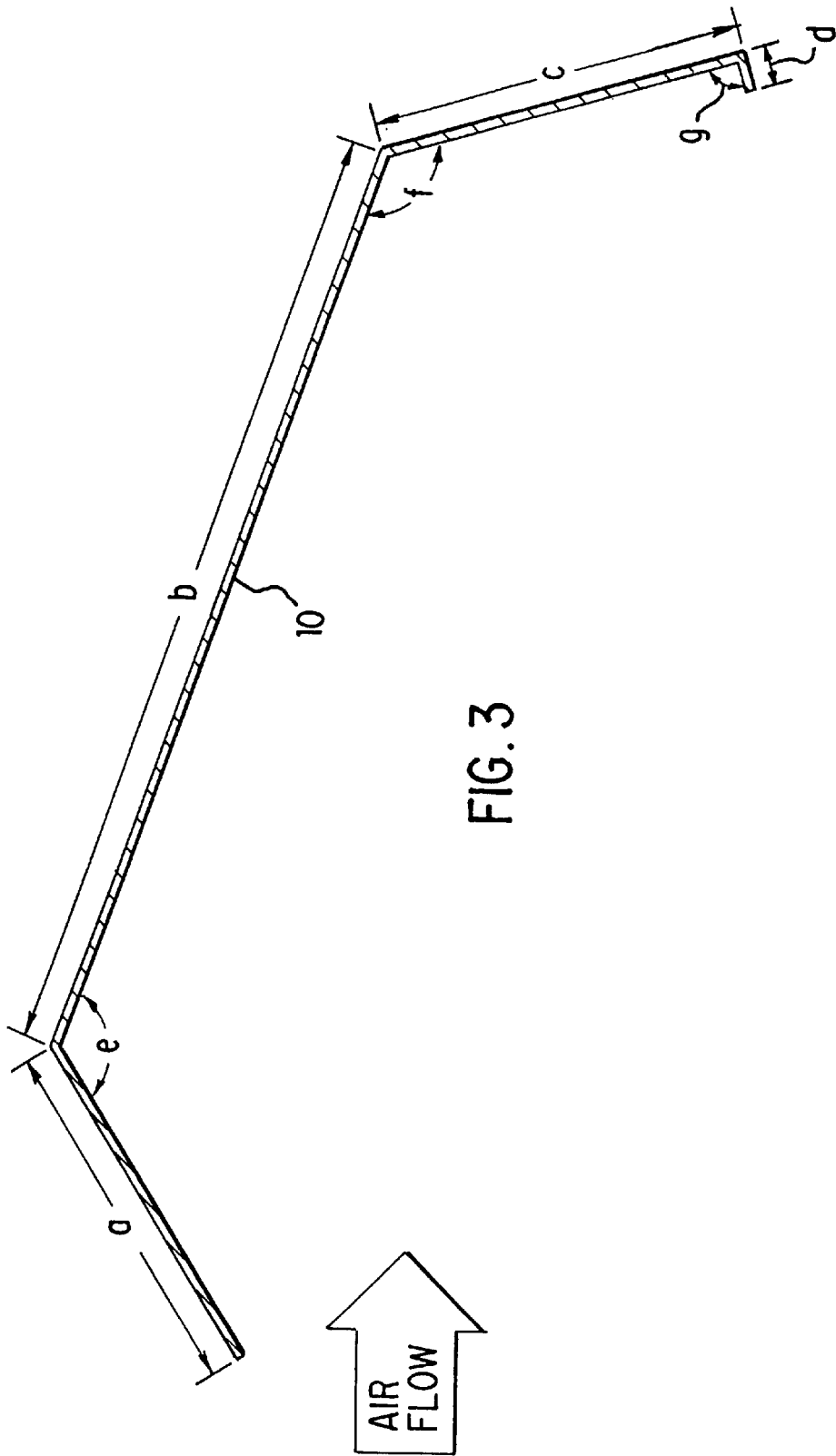
FIG. 3 is an enlarged cross-sectional view of the airfoil shown in FIG. 2 taken as indicated by the lines and arrows 3—3 in FIG. 2.
Figure 4:
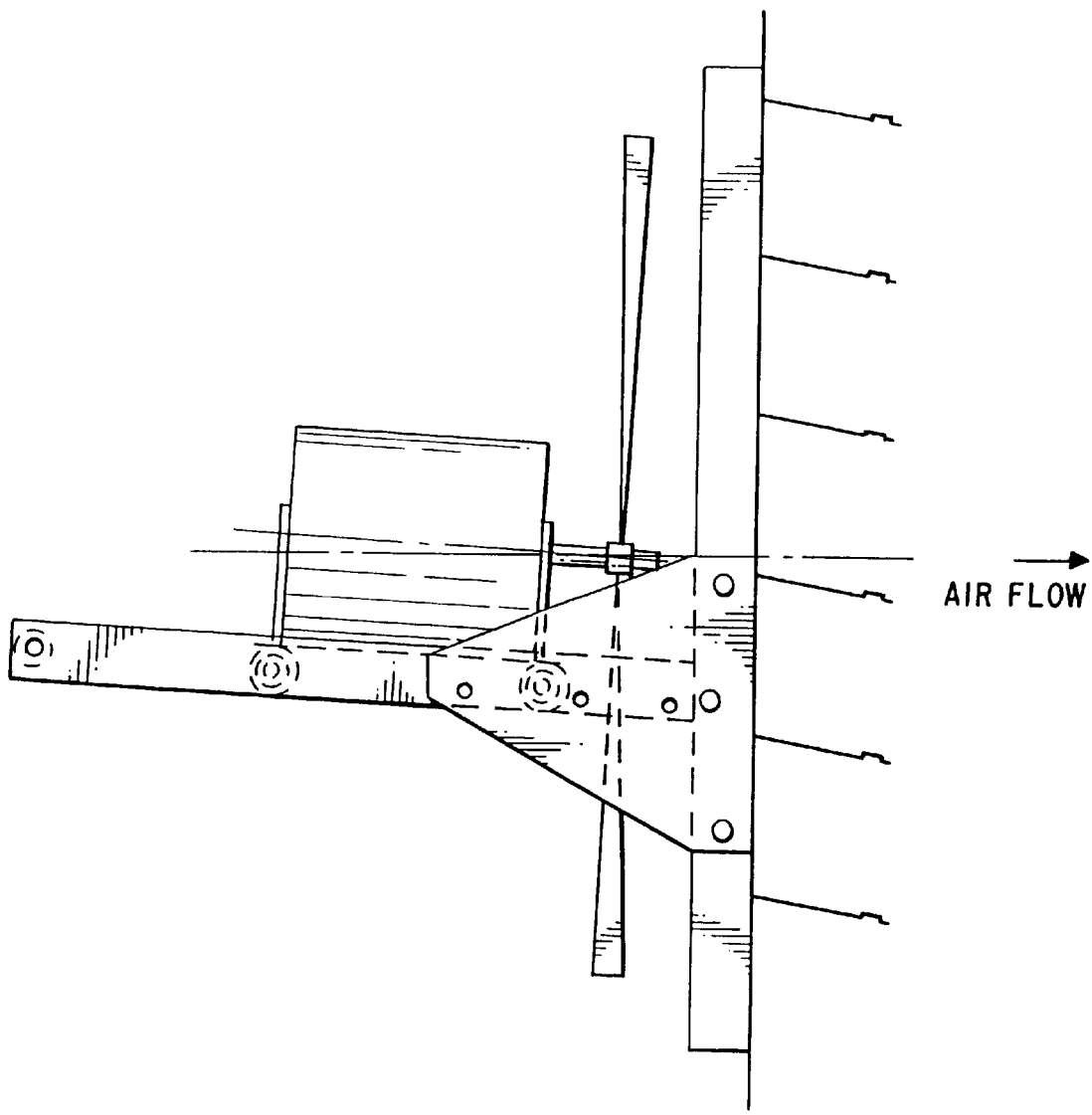
FIG. 4 is a vertical elevation of a damper fan assembly.
Figure 5:
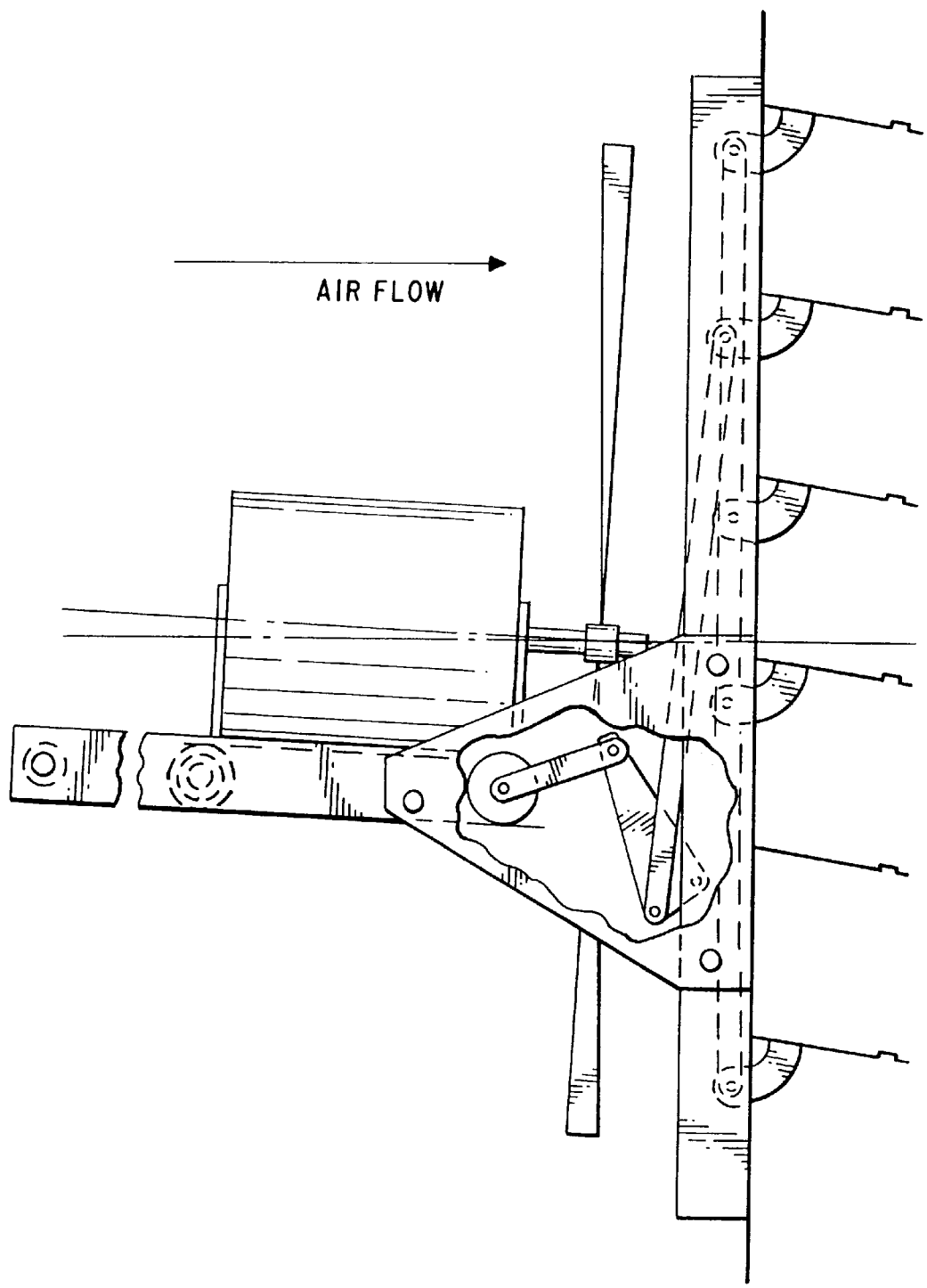
FIG. 5 is a vertical elevation of a damper fan assembly partially broken away to show other elements of the assembly.
Figure 6:
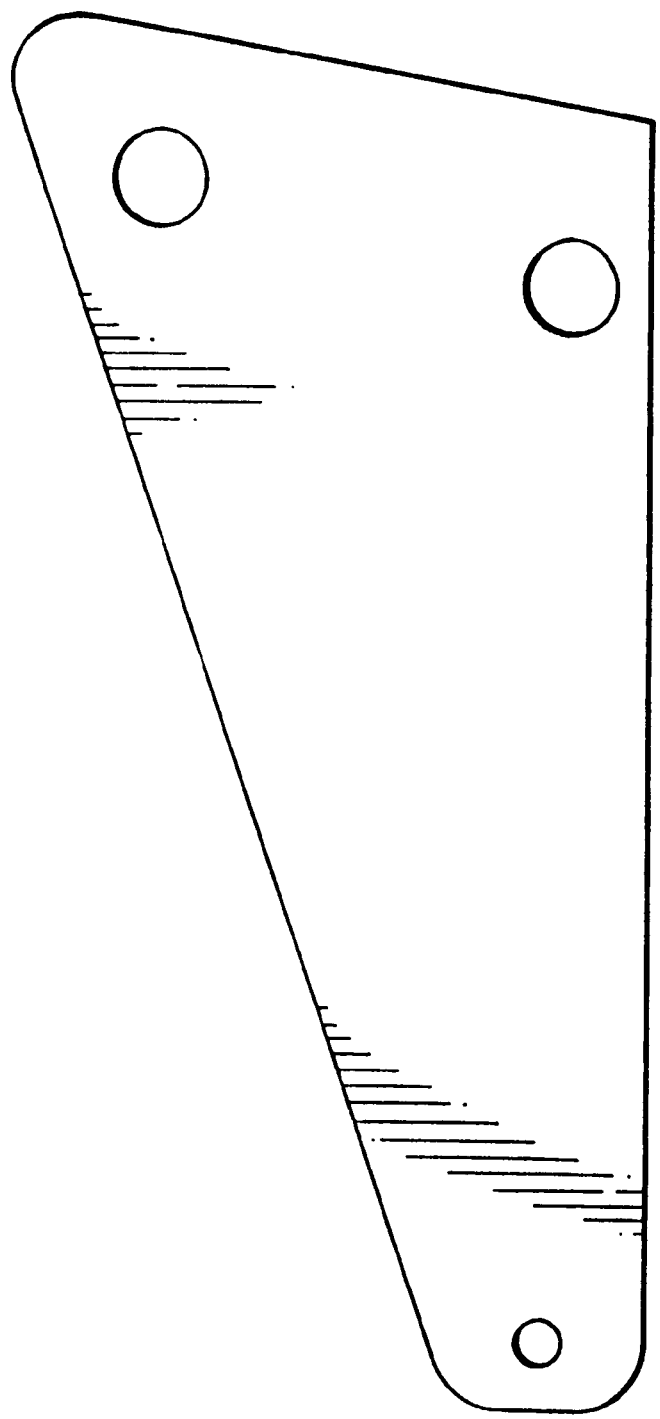
FIG. 6 is a detail of a portion of the device shown in FIG. 5.
Figure 7:
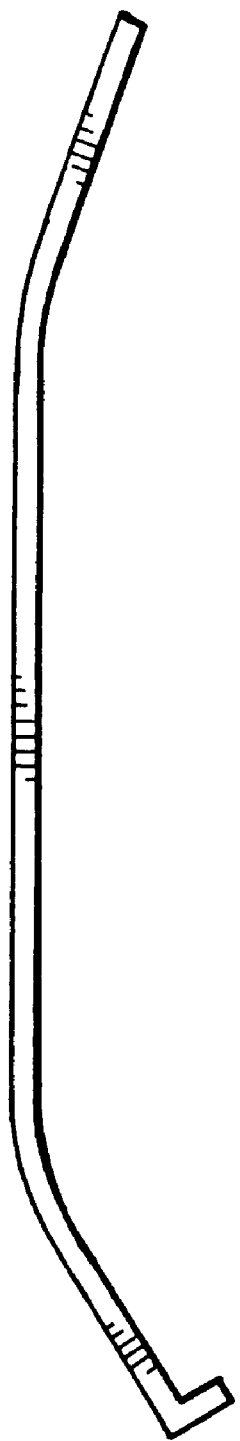
FIG. 7 is a detail of a structure in accordance with a preferred embodiment of my invention.

Referring now to FIGS. 2 and 3, I will describe in detail the airfoil 10. As an example of the exact measurement and construction of this blade for use in a small (under ten feet diameter) working windmill, the dimensions are as follows: the leading edge, a=4"; the intermediate planar portion, b=11.5"; the trailing edge, c=4.125"; the flange, d=0.562"; angle e is 130°; angle f is 127°; and angle g is 90°. The material used is 11 gauge aluminum.

The cross-sectional shape of this airfoil shows that it comprises essentially a planar intermediate face portion "b" and leading "a" and trailing "c" edges associated with opposite longitudinal edges of said intermediate portion, such that the cross-sectional shape is pan-shaped having concave and convex surfaces; with a flange "d" extending from the trailing edge "c" back toward the leading edge "a" in the concave area.

This blade is mounted so that the wind impinges first upon the lead edge "a".

In actual tests, a windmill unit with blades at 36 degrees needed wind at 7 mph to overcome inertial forces and start the windmill turning. A wind of 3 mph was necessary to maintain its rotation. When blade angles were increased, threshold speeds were higher and running speeds increased. Thus, it was determined that the optimum blade setting for low winds seemed to be better at shallower angles.

It is theorized that the preferred blade shape and positioning captures air rather than let it pass freely through the apparatus. This has several effects. First, it causes aerodynamic lift. Secondly, it can trap air and increase the driving force.

Consider Bernoulli and fast moving air—the speeds are different, but the air is doing one more thing—it's not following a straight path; perhaps, thanks in part to cohesion and surface adhesion. Try acceleration of the firmament (air). Like many mass elements, it does not really want to move for free and that is the basis for an improved aerodynamic theory. Understanding that both over the top speeds up and underside impacts/deflects; and that an airfoil is forced through those columns of air faster than they can fall back down on themselves, could contribute towards further expansion of lifting device types—not just better wing shaping, but wholly different modes of obtaining lift from atmospheric pressure.

We are now into thin angled surfaces with minimum curves as wing configurations. What about those kites, sails, hang gliders, ultra lites and some high speed winds that essentially have the same distance for the air to transverse both under and over the surface? The continuous downward curve seems more the trick than faster or slower air—not to deny accelerating the lower (impact) air with smoother more massive (may be almost passive) under surface flow; and over the top turbulence—anything to help the pressure differential is okay. Transferring the lower surface air onto the upper surface might help. Basically, any way to move the air layer that is on the top surface away from that surface faster than the above column can drop back onto it is the goal—while pumping up or impacting (with less drag) the air under the lifted body. As a wing slows (the rate of air acceleration is still constant) the vertical drop across the wing (angle of attack) must be further. Aerodynamic lift is one of the (few) processes that both prime force elements combine for the total final advantage. The bottom surface compresses and deflects the air down and skis on it (again Newton's first law), while the top surface out accelerates away from the falling upper air. This results in an amplified gain—possibly because lift uses gravity enhanced by time differential inertia directly (converted from differential atmospheric pressure) against its self.

The engine thrust of most airplanes will not hold the plane (going straight) up, but exploitation of aerodynamic lift will allow the engine power to work through another medium and obtain an amplification of the power into the extra lift energy.

The trailing edge flap is an example of the air foil providing a long and continuous air column chase to re-close on itself. Shaping a surface to continually increase its curvature (sometimes a wave shape) further away from the accelerating air column gains more lift. Apply Bernoulli's concept of a curved surface increasing the distance and therefore the speed of separated air flow is substantially different from thinking of a curved surfaced that provides an inertially based constantly dynamic void (lower pressure) from an accelerating air mass. The designing for inertialized aerodynamic force differentials would permit vastly different devices other than wings.

Ground effect has been somehow accommodated as an unexplained insufficiency of Bernoulli's principle, without suspicion. It seems the accelerating (against its own inertia) deflected air column has sufficient conducting to the adjacent air that its rate of acceleration can be slowed. Normally, in large air space, this would be a constant, but proximity of the lift device to the other surfaces, particularly the ground, can alter the air motion. If the air adjacent to the accelerating column is less free to be dragged down, it can slow the closing process producing more pressure differential. Air has some body by self attraction. An air (or water) jet becomes noticeably more transmitted back to the nozzle holder as it is pushed closer to a surface. So it is with ground effect.

Figure 9A:
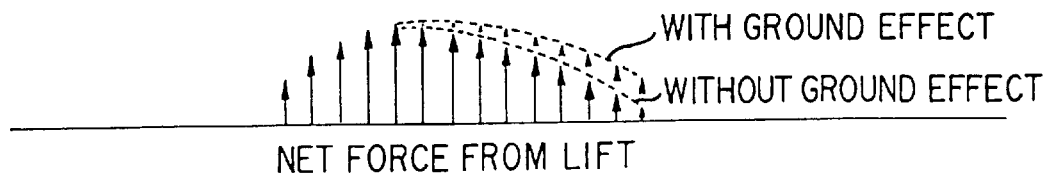
FIGS. 9A, 9B, and 9C are graphical representations of the Bernoulli style airfoil with and without ground effect.
Figure 9B:
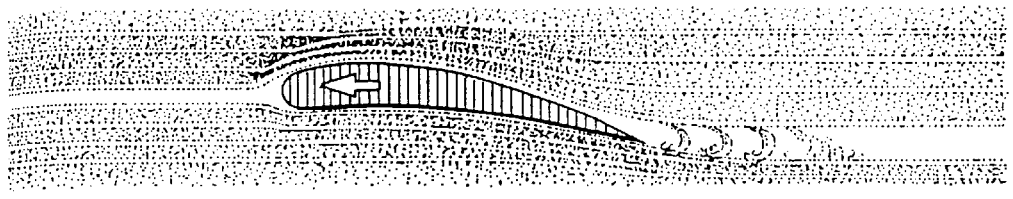
Figure 9C:
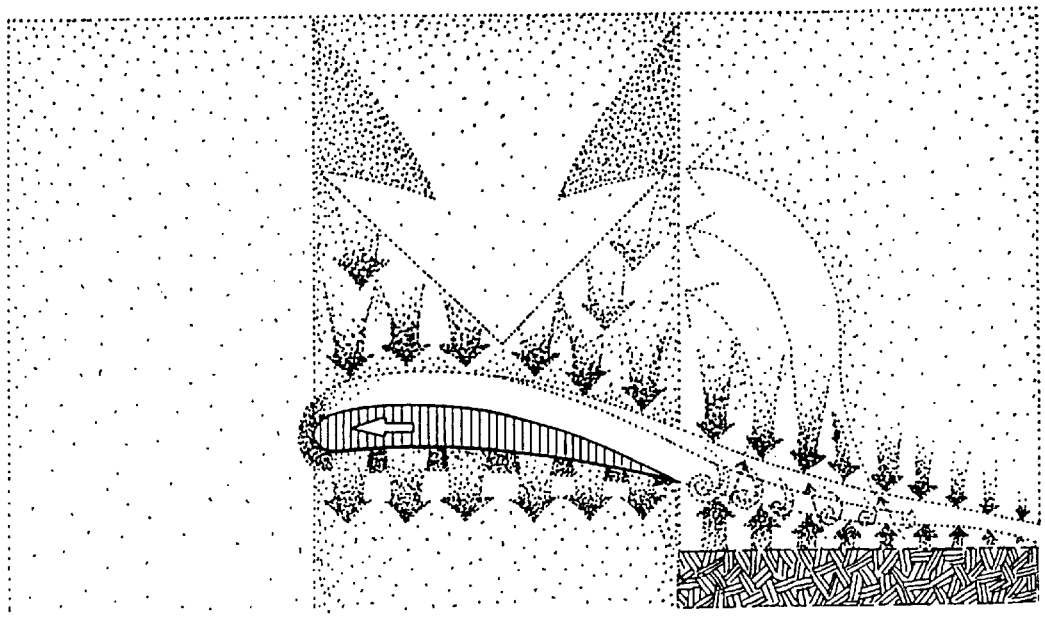
Figure 10A:
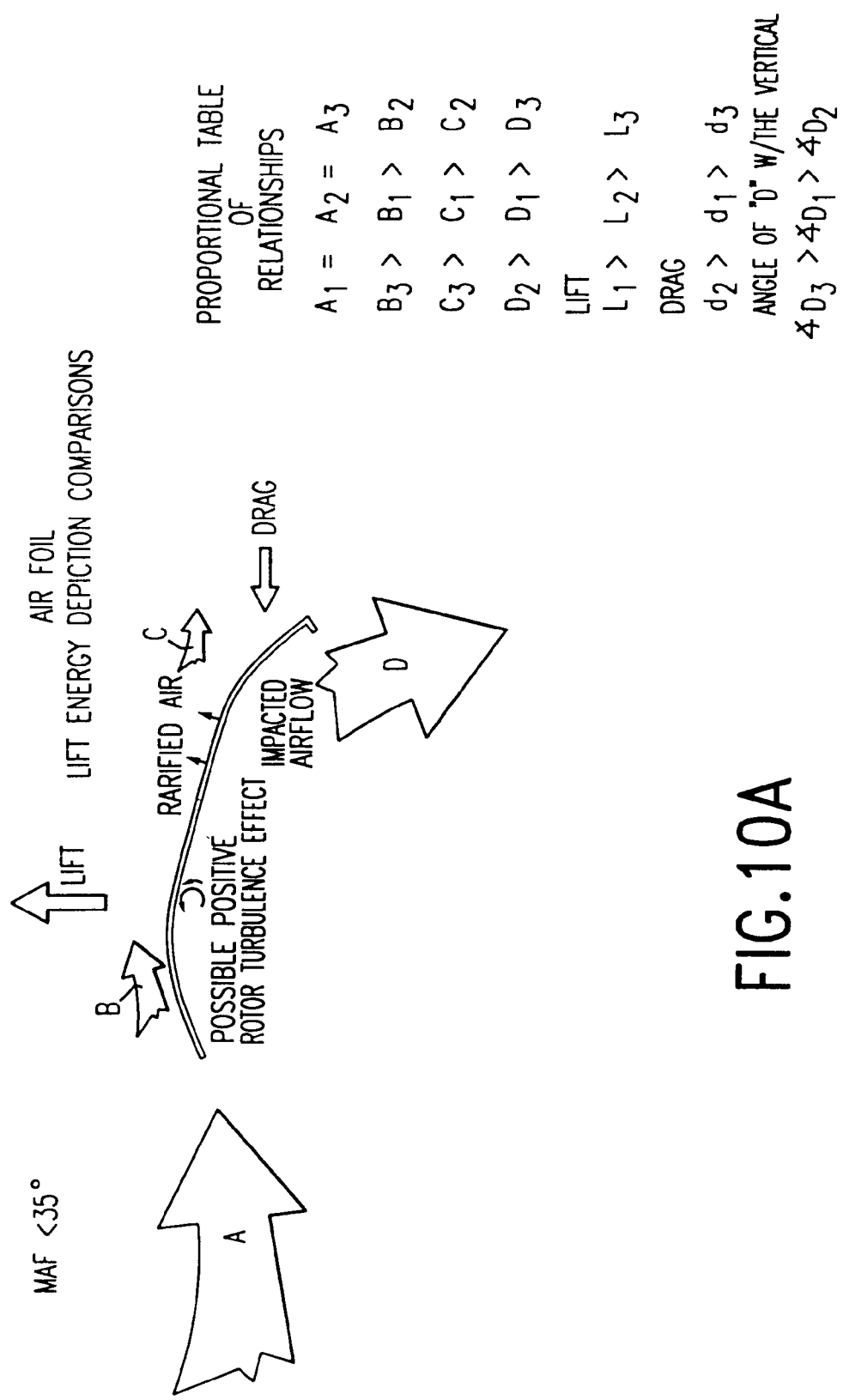
FIGS. 10A, 10B and 10C are graphical representations of lift energy comparisons on airfoils.
Figure 10B:
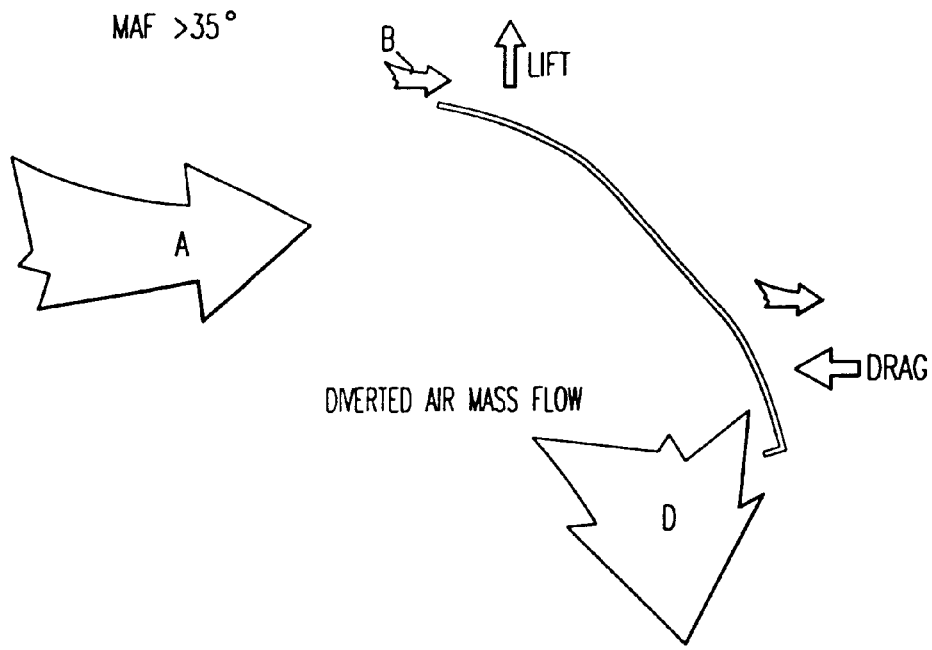
Figure 10C:
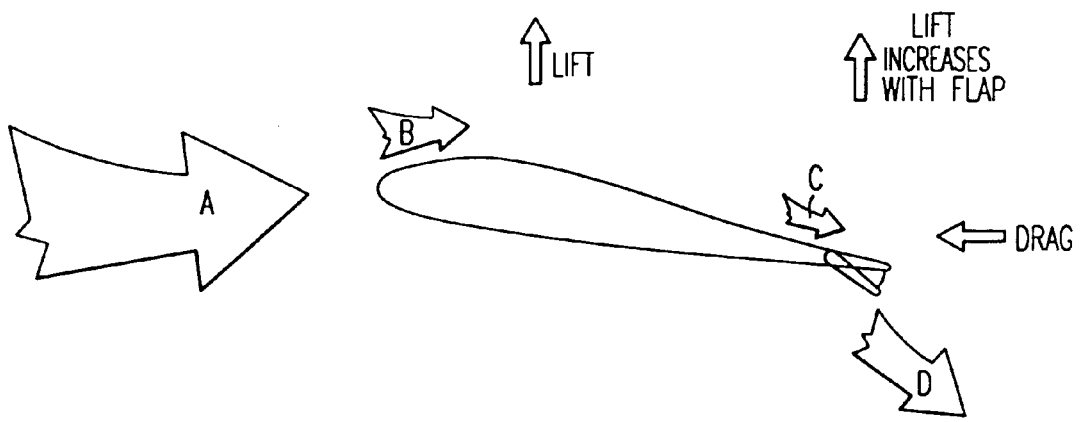
Figure 11A:
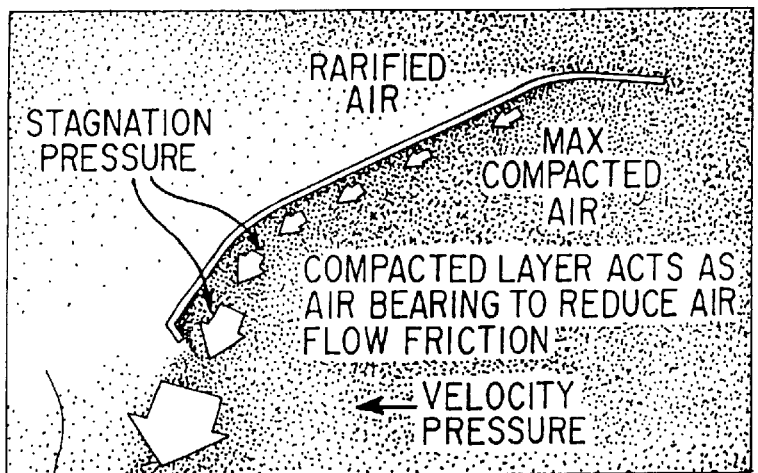
FIGS. 11A, 11B, and 11C show computer graphic representations of lift air mass flow energy.
Figure 11B:
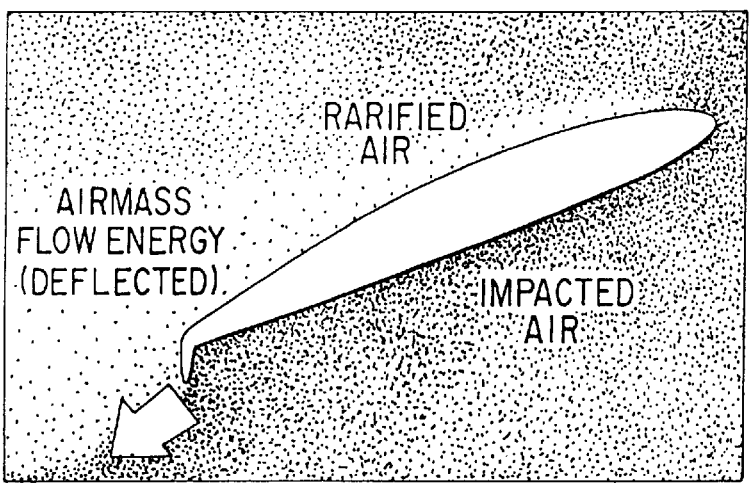
Figure 11C:
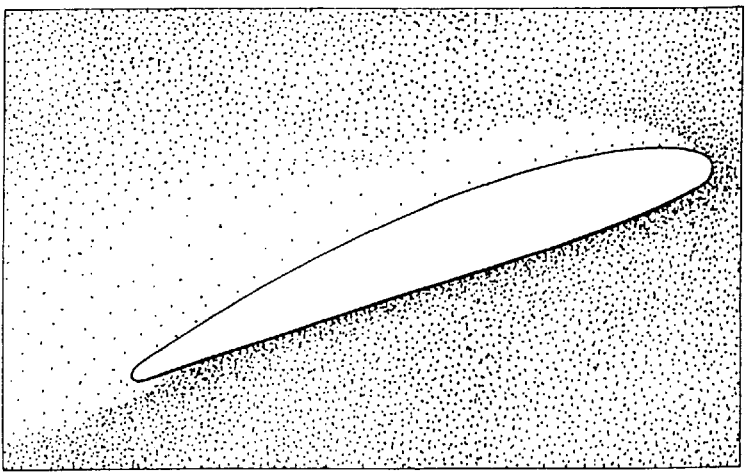

See the representations in FIG. 9.

Also, in a windmill, for example, the adjacent blade can enhance the lift. The device will not continuously accelerate and burn up because the relative wind change due to rotation reduces lift acting as a braking action as the angle of attack approaches the zero lift range. In operation, this means that the device collects as much force as possible, even though it is going slower rather than faster; as in the prior art. For example, at a 60 to 65 mph wind, the maximum speed of a small size mill would be approximately 100 revolutions per minute (rpm).

It has been observed that with less blades there is greater speed while, when using this device with more blades, there is more torque and lower speed.

A number of prior art blade shapes, as shown by the shapes illustrated schematically in FIGS. 1A through 1D were tested using a wind tunnel. The blades shown from the top are: blade 1A, an ordinary airfoil carved from balsa wood in the shape used by NACA (the predecessor of NASA) for lower speed aircraft (such as gliders or model airplanes) to provide the highest lift known; a fan blade airfoil made of plastic, 1B; an airfoil blade of the type shown in U.S. Pat. No. 4,655,122, 1C; and an airfoil with a flap at the back (also per NACA) as shown in 1D.

Experiments focused on the torque enhancement from air flow inducement provided by windmills and blades or "air dams" which were designed to harness the most force possible from a given air flow. Blades were selected for their ability to maximize force. Tests were conducted to establish a relationship between air mass flow and volume stored under pressure (density). The object was to determine the spacing and fluid flow interaction between blades which would yield the most force, thus determining the number of blades to be used in a windmill. For preliminary testing, it was decided to use fourteen blades in an eight foot windmill. A total of seventeen blade prototypes were made and tested. The drawings, FIGS. 1A through 1D each show a representative sample of a prior art blade cross-sectional configuration. FIGS. 2 and 3 show my invention, which was also tested.

The testing involved several steps. First, each blade was installed at a specified angle (the installment angle range was 20° through 35° at intervals of 5°; and sometimes included readings at 15°). The blades were balanced to insure equilibrium prior to starting the air flow. With the wind on, two measurements were taken: maximum upward force and optimum angle at which the maximum force occurred. Testing progressed with three things in mind:

1. Optimum position (forward or backward for either or both blades);
2. Spacing between blades that would yield the highest force readings; and
3. The angle of the blades which would yield the highest force readings.

The most important relationship found in this testing insofar as windmills were concerned was the spatial arrangement of the blades. It is theorized that while blade position is not the most important factor concerning the pattern of force reading; it is a very important factor in the magnitude of the force readings. Thus, it was determined that the highest force readings occurred when two blades, configured as in FIG. 3, were positioned in a wind tunnel test where one was mounted over another, and were in the position relative to the air flow as shown in FIG. 3.

While what I have described has been described in connection with a windmill application, it should be apparent that what I have invented is a blade whose shape produces lift which can be used in a propeller or impeller or fan. I believe the propeller/impeller blades can be enhanced by a tapered shape and by transitioning from the slower (wind mill air speed range) shape at the hub to a flatter angled pan-shape with shorter forward facing trailing edge flanges at the (faster moving) tips. This aerodynamic shape builds up pressure underneath rather than relying on negative pressure on the top, because, I theorize, the air is dammed up within the blade envelope.

In the prior art, for example, the ordinary airfoil can be initially mounted with an angle of attack which goes from 15° to 26° and thereafter "stalls" (that is, begins upper surface separation and turbulence). With this blade shape, it is possible to start lower and go further, i.e., 7° to 45°. Further, in the prior art, if one were to plot lift versus angle of attack, the curve past 26° would ordinarily drop off. With my blade, the curve is essentially a flat curve. I have observed that there is as little as 7½% deviation from 15° to 45°.

I also note that the shallower the angle of attack, the more the blade acts as a normal airplane blade wing shape. When the angle gets to approximately 32°, more air is trapped within the blade envelope; particularly because of the back angled flange and, thus, there is provided greater upward thrust.

In a steep angle between 30° to 45°, I believe the blade is no longer working as an airplane blade wing would, in that the negative pressure along the top of the wing is the lesser means by which force is being imparted. Rather, the airfoil is being air lifted.

Testing

I believe that fairly thorough multi-method testing has been accomplished from visual (particles) imprinting into a computer rendering—through large and small wind tunnels and finally into fan, windmill and propeller applications.

Figure 12A:
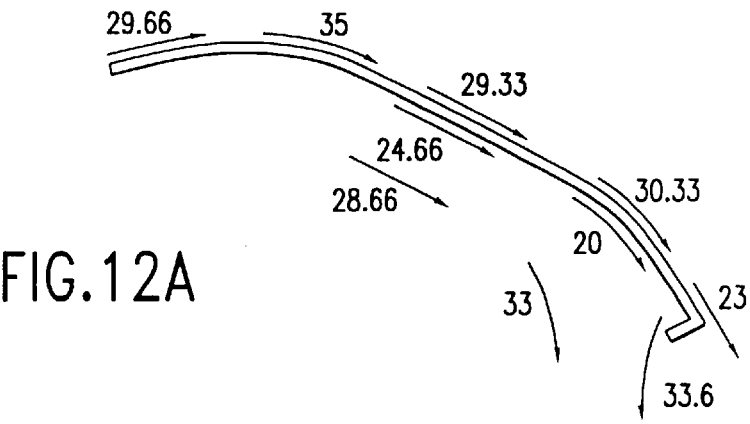
FIGS. 12A, 12B and 12C are graphical representations of airfoils under various air flow angles of attack.
Figure 12B:
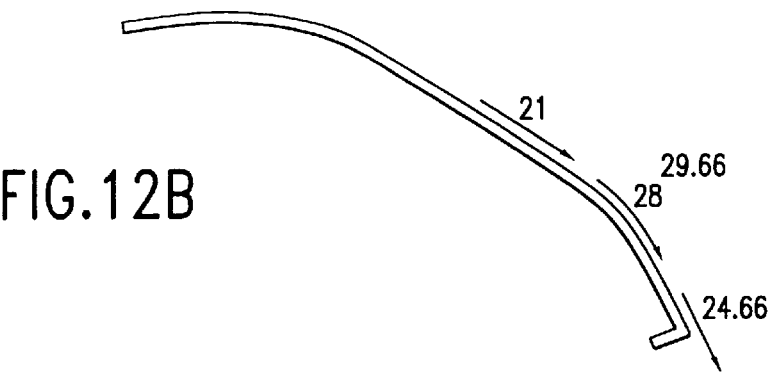
Figure 12C:
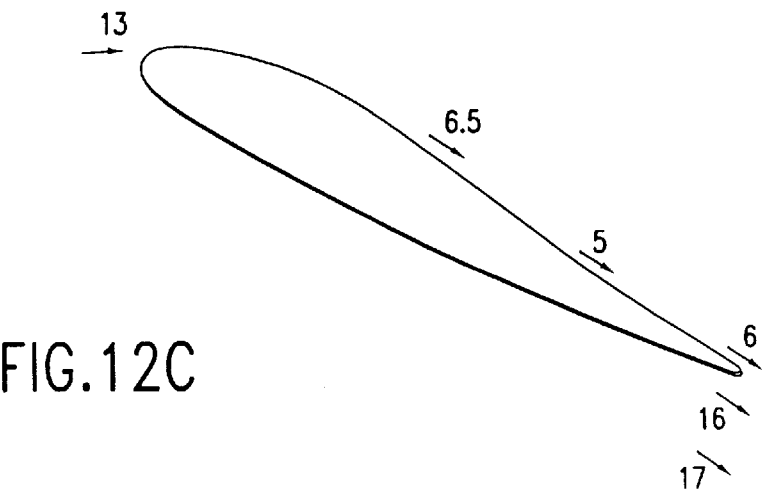
Figure 13A:
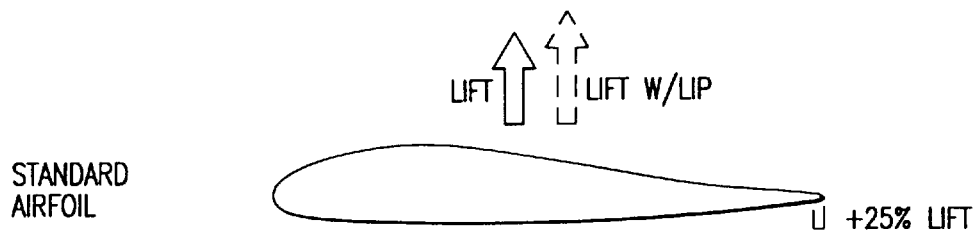
FIGS. 13A, 13B and 13C are graphical depictions of the trailing edge lip as applied to a standard airfoil.
Figure 13B:
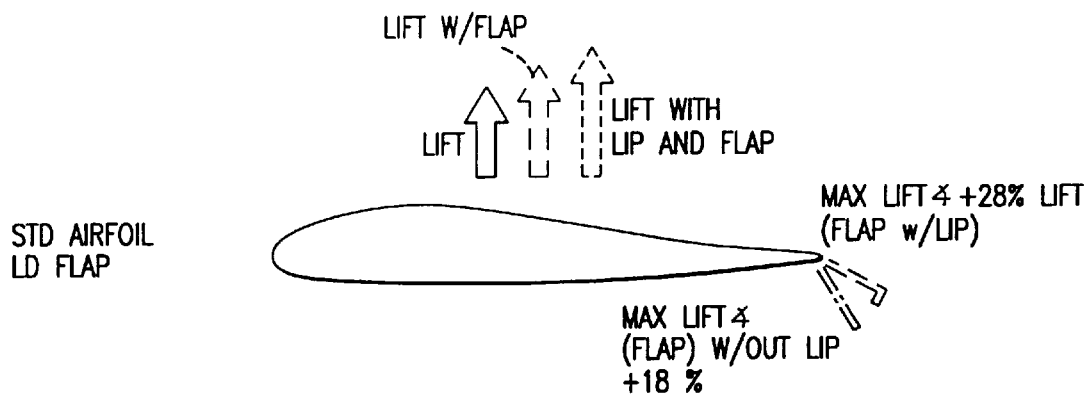
Figure 13C:
Figure 15:
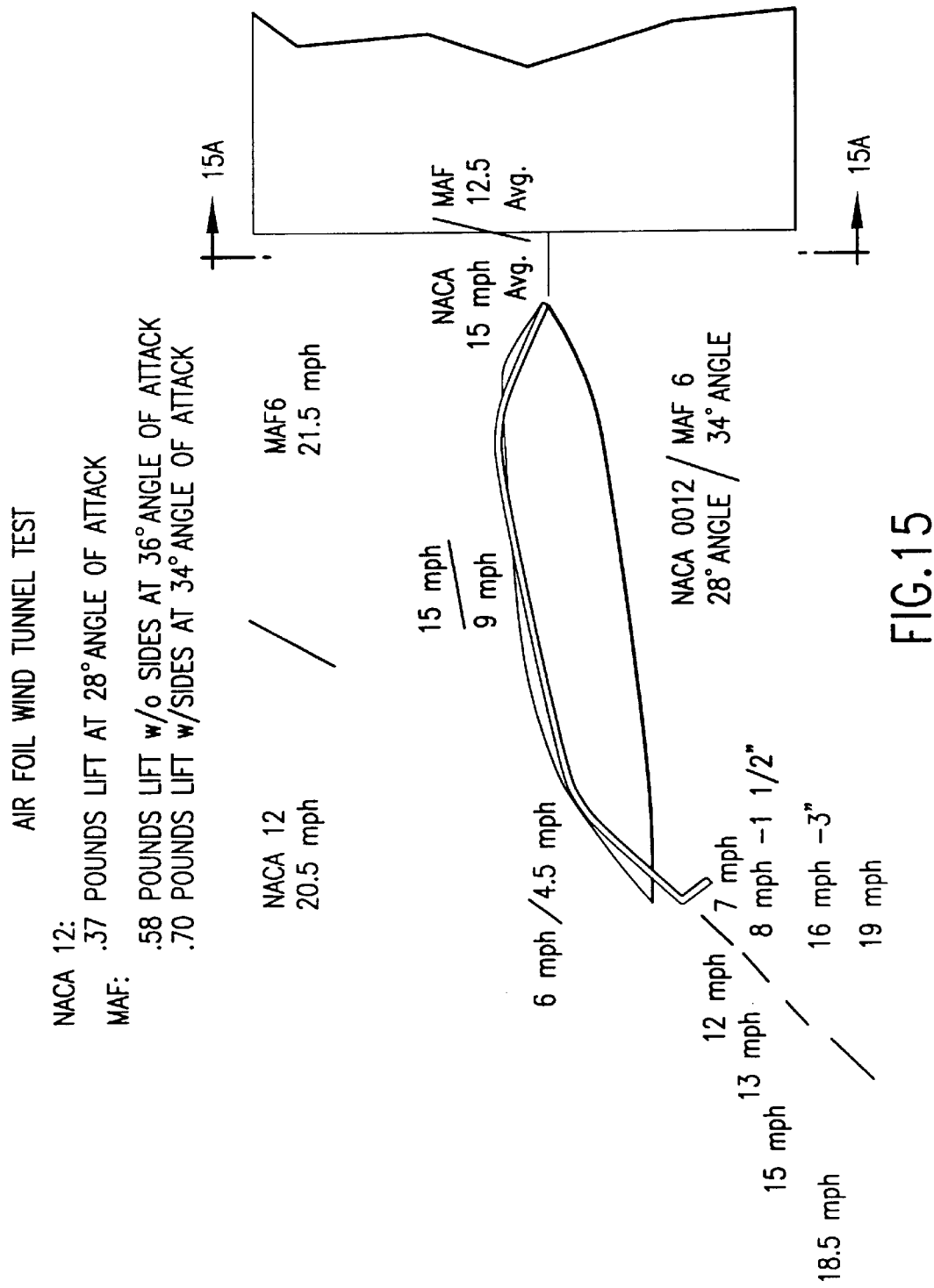
FIG. 15 shows a graphical representation of an airfoil for use in an airfoil wind tunnel test.
Figure 15A:
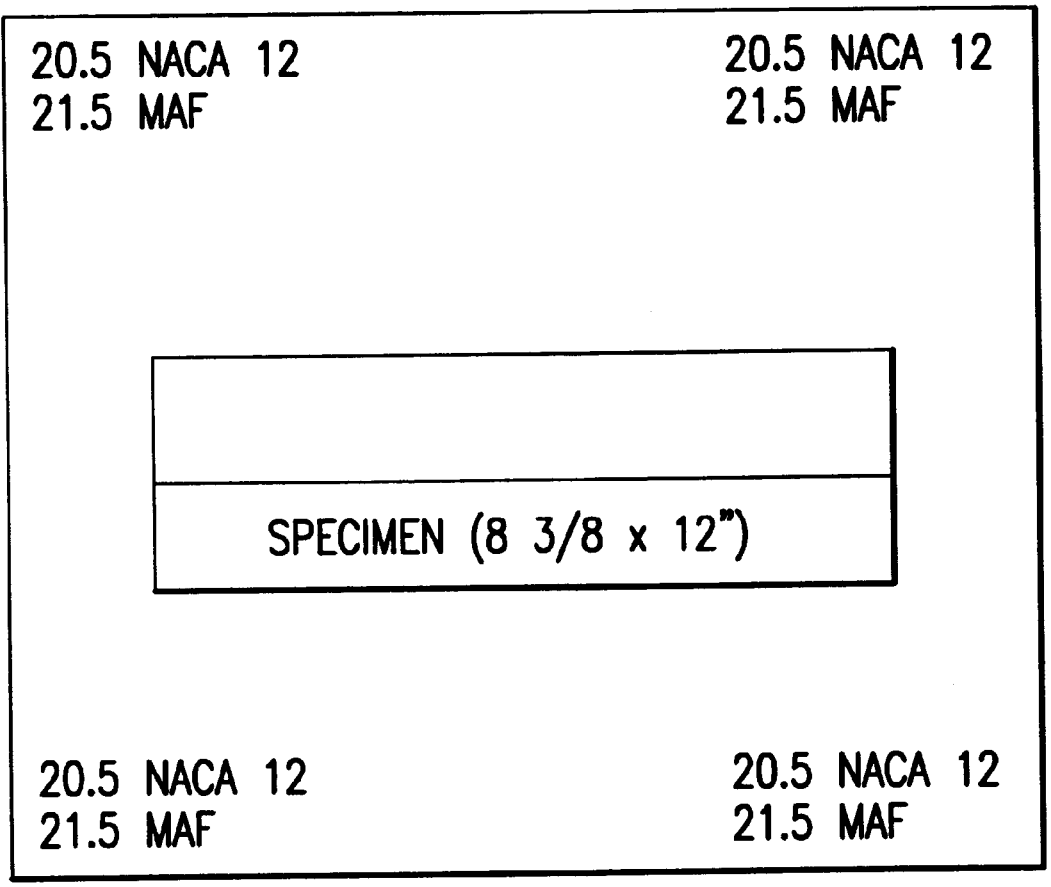
FIG. 15A is a view taken as indicated by the lines and arrows A—A in FIG. 15.
Figure 17A:
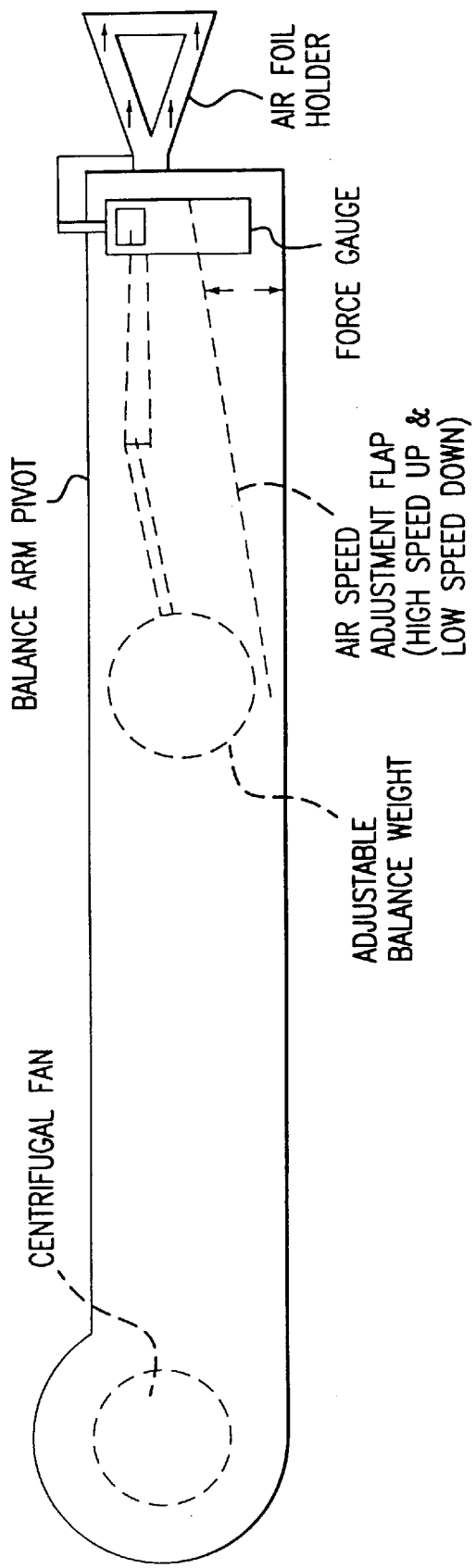
FIG. 17A shows schematically the set-up of the wind tunnel test equipment schematically.
Figure 17B:
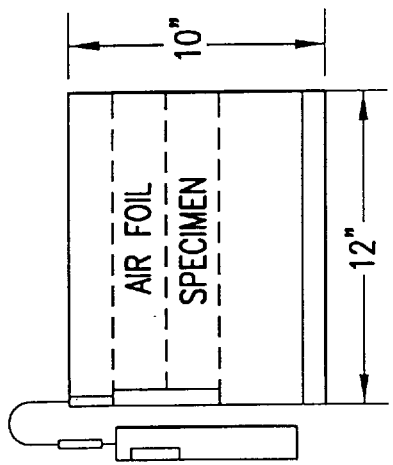
FIG. 17B is an end view of the schematic of the equipment shown in FIG. 17A.
Figure 18:
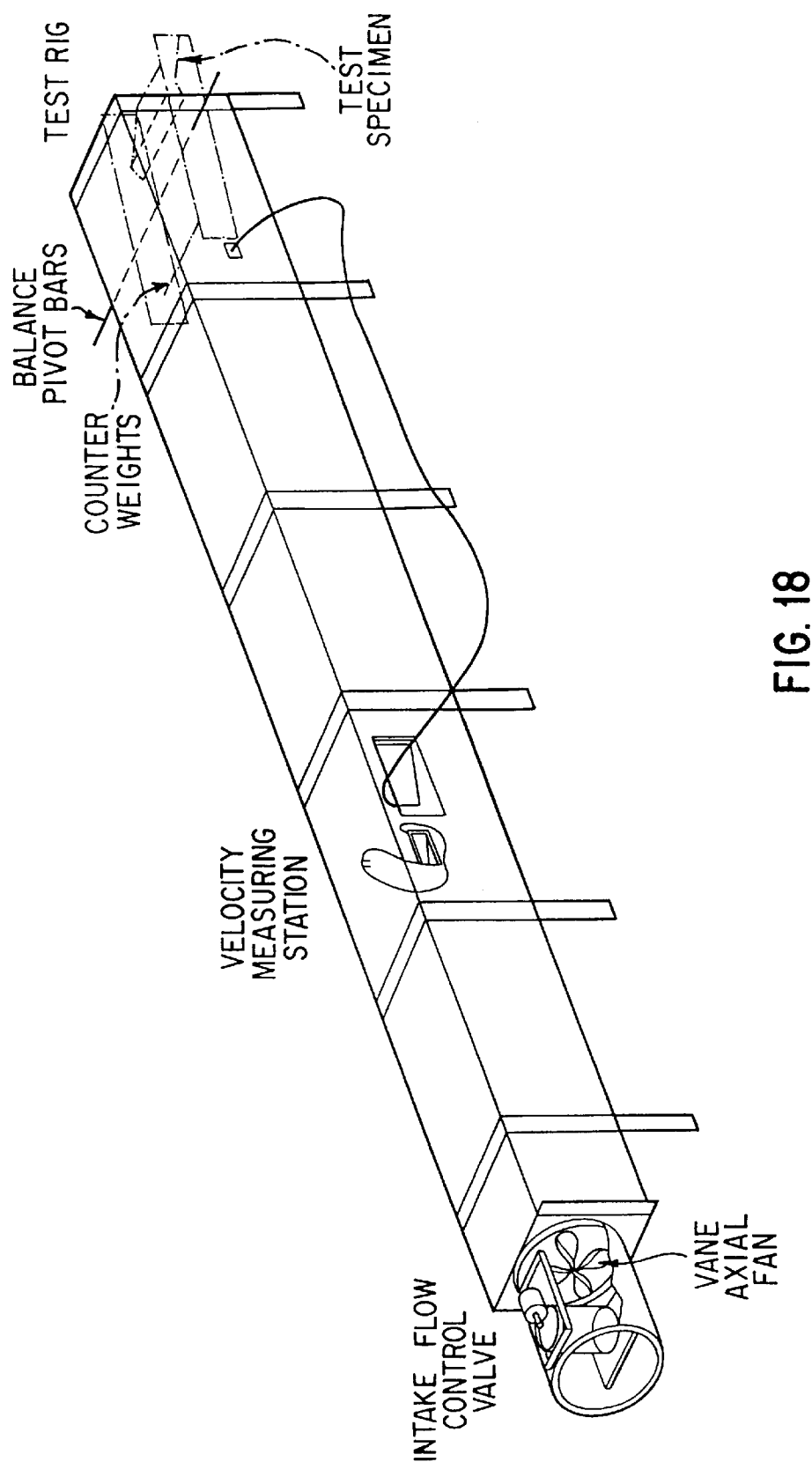
FIG. 18 shows a perspective view of the wind tunnel test equipment shown in the prior figures.

Over double the lift of standard airfoils (e.g., NACA 0012) and various other shapes has been observed, along with a lengthened and flattened lift to angle of attack performance. L/D may be enhanced. See the following representations and results of tests in FIGS. 10A, 10B, 10C, 11, 12A, 12B, 12C, 13A, 13B, 13C, 14, 14A, 15, 15A, 16, 17, 17A, 17B, 18 and 19. As to FIGS. 12A, 12B and 12C, all measurements are in miles per hour and are located approximately where readings were taken. The arrows shown point in the direction of air flow. FIGS. 14 and 14A show an air foil wind tunnel test on an MAF #6 (original shape with sharp corners). View A—A shows tunnel free air velocity. FIG. 15A shows outer tunnel flow profile. FIG. 18 shows a 24 inch by 24 inch wind tunnel with outward projected balanced specimen test mount.

PERFORMANCE ASSESSMENT OF MY WIND ENERGY UNIT COMPARATIVE WIND TUNNEL TESTS ON MY (MAF) AND NACA 12 AIRFOILS

Summary

This report details the results of a comparative study between the lift performance characteristics of my airfoil and those of the standard NACA 12 airfoil. The tests were performed by me and my team in my testing laboratory in Doylestown, Pa. In a wind regime of 25 mph and at six different attack angles ranging from 15° to 40° in 5° increments, my system generated an average 78% improvement in lift over the NACA 12 airfoil. Moreover, the maximum lift achieved using my blade occurred at an angle of attach of 34° and was 89% larger than the maximum lift generated by the NACA 12 airfoil which occurred at an angle of 28°.

My (MAF) Airfoil

The prior figures show two of my blades used in the experiment. The dimensions of the airfoils are given in inches and are both 12" wide. These blades are referred to as #6 wing and #8 wing respectively. Endcaps were fitted to #8 wing and the dimensions of the end these caps are shown in these figures. The purpose of these end caps is to simulate the wind regime experienced by the blades in a wind turbine. These figures show the dimensions of these end caps and the location of the blade on these endcaps.

The NACA 12 Airfoil

These figures show the profile of the NACA 12 Airfoil. The width of this airfoil was fixed at 12".

Experimental Apparatus

The wind tunnels used in the experiments are shown in these figures. The larger tunnel shown is 15'4" long and 24" by 24" wide. Wind generation was by a 4 horsepower, 3 phase motor driving a fan. The blades tested were suspended outside the back end of the tunnel between the ends of two counter balanced arms, as shown in the Figure. The blades were secured between these arms by means of retaining bolts and nuts. The other end of these arms were attached to a spring balance which measured the lift generated by the blade. The smaller wind tunnel is shown in the figures. The airfoils were again held outside the wind tunnel by extended arms. An electronic spring balance was used to measure the generated lift.

A magnetic dial balance was used to measure the orientation of the blade relative to the wind direction. This orientation could be easily altered by simply loosening the retaining nuts and rotating the blade relative to the supporting arms.

In both set of experiments, a hot wire anonometer was used to measure the wind velocity in the tunnel.

Experimental Procedure

The first series of experiments were conducted in the small wind tunnel. The objective of these experiments was to record the lift generated by #6 wing without endcaps, #8 wing with endcaps and the NACA 12 airfoil as a function of attack angle. Each blade was secured to the balance arm by means of a retaining bolt and nut. The leading edge of each blade was located 3.5" from the top edge of the tunnel and 1⅜" outside the back end of the tunnel. The arm was then balanced by the addition of counter weights, so that the electronic spring balance was zeroed. The orientation of the blade was set at 15° relative to the longitudinal plane of the tunnel, using a magnetic dial balance. The electric fan was then engaged. The lift generated by the blades caused the supporting arm to rotate. The amount of lift, in pounds force, was recorded by the electronic balance located at the other end of the support arms. The fan was then switched off, the angle of attack increased by 5° by loosening the retaining nut and rotating the blade relative to the arm. The fan was restarted and the lift recorded. This procedure was repeated until a spectrum of attack angles covering 5° to 45° was covered in 5° increments.

The same procedure was use to establish the maximum lift in the larger wind tunnel.

Results

The large tunnel was used to establish the maximum lift generated by both the MAF and NACA 12 blades as a function of the angle of attack. Table 1 presents the results of this investigation. For a wind velocity of 18 mph, the maximum lift generated by the #8 wing (with endcaps attached) was 0.70 pounds at an angle of attack of 34°.

This experiment also investigated the maximum performance of the airfoils without endcaps. For these conditions, the maximum lift generated by the MAF blade was 58 pounds at 36°, while the corresponding figures for the NACA 12 blade was 0.37 pounds at 28°. Again, a wind velocity of 18 mph was used.

TABLE 1

MAXIMUM LIFT CHARACTERISTICS
Large Tunnel Results
Wind Speed 18 mph

| Angle of Attack (degrees) | MAF Airfoil #8 Wing Without Endcaps (lbs.) | #8 Wing With Endcaps (lbs.) | NACA 12 Airfoil Without Endcaps (lbs.) |
|---|---|---|---|
| 34° | | 0.70 | |
| 36° | 0.58 | | |
| 28° | | | 0.37 |

Table 2 gives the results of the experiments conducted in the small wind tunnel. In these experiments, the wind speed was set at 25 mph. The results compare the performance of the #6 wing without endcaps, the #8 wing with endcaps and the NACA 12 without endcaps. The lift generated by these three blade configurations was established as a function of angle of attack. An initial angle of 15° was set and the lift generated by the three blades was recorded. A wide range of attack angles were investigated ranging from 15° to 45° in 5° increments. Table 2 presents clear evidence of the improved lift performance characteristics of the MAF airfoil over its conventional rival.

TABLE 2

LIFT AS A FUNCTION OF ANGLE OF ATTACK
Small Tunnel Results
Wind Speed 25 mph

| Angle of Attack (degrees) | MAF Airfoil #6 Wing Without Endcaps (lbs.) | #8 Wing With Endcaps (lbs.) | NACA 12 Airfoil Without Endcaps (lbs.) |
|---|---|---|---|
| 15° | 2.23 | 2.63 | 1.08 |
| 20° | 2.43 | 2.25 | 1.40 |
| 25° | 2.55 | 2.60 | 1.65 |
| 30° | 2.75 | 2.85 | 1.67 |
| 35° | 2.80 | 3.10 | 1.55 |
| 40° | 2.75 | 3.25 | 1.47 |
| 45° | N/A | 2.90 | N/A |

Conclusion

This documents the results of a comparative study into the lift performance characteristics of the MAF airfoil and the NACA 12 airfoil. The experiments were conducted using two wind tunnels. A number of conclusions can be made based on the results of these experiments.

The lift generated by the MAF airfoils is on average 78% larger than that generated by the NACA 12 blades.

The addition of endcaps to both blade types improves the lift generating capacity significantly. In particular, the performance of the MAF blade is improved by between 2% and 18% depending on the attack angle.

Figure 20:
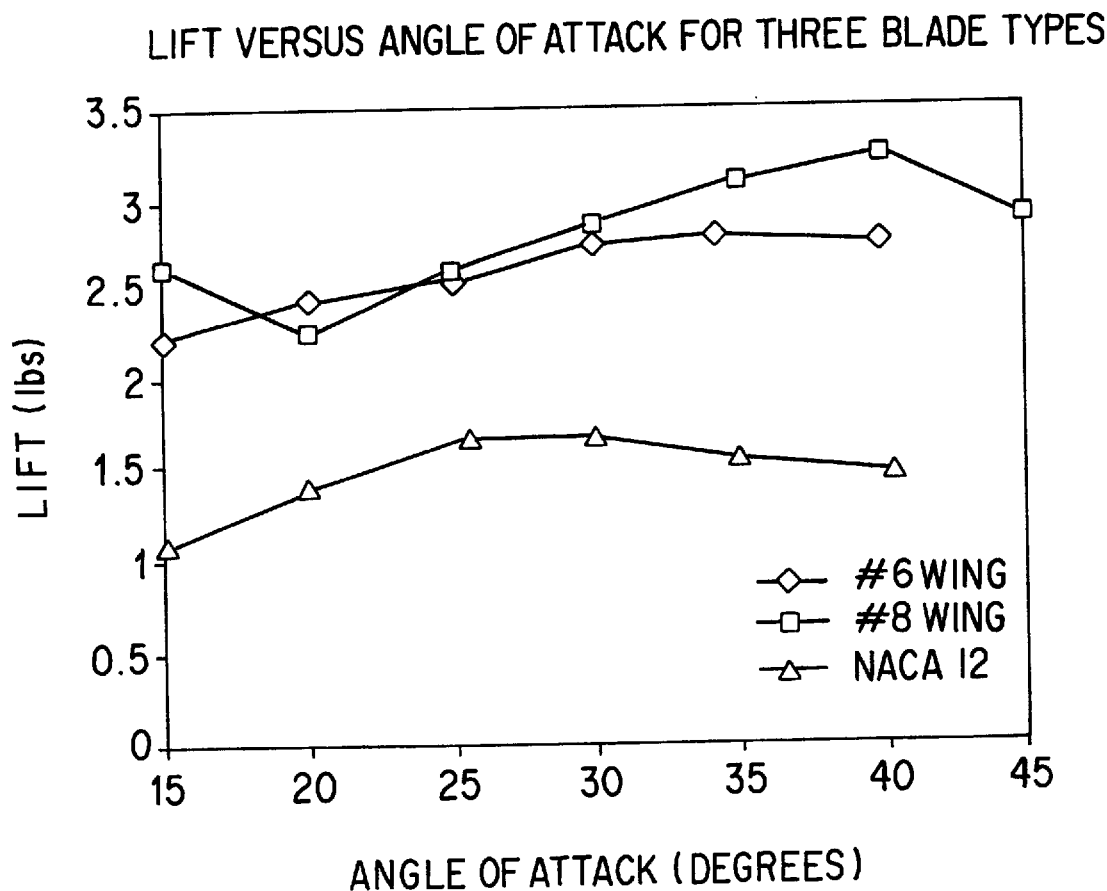
FIG. 20 is a graph of lift vs. angle of attack for three blade types.

The MAF airfoil generates maximum lift at a larger angle of attack as compared to the NACA 12 blade. Maximum lift is reached at approximately 40° with the MAF blade, while the NACA 12 airfoil attains maximum lift at 30°. The addition of the endcaps has the effect of increasing the attack angle required to generate maximum lift. See graph FIG. 20.

This is an explanation of how my airfoil works and what is different between the three uses of it. If I use this foil to move air, I call it a fan. If I use this foil to move whatever it is connected to, I call it a propeller; and if I use this foil to be moved by the air or wind, I call it a windmill.

Figure 21:
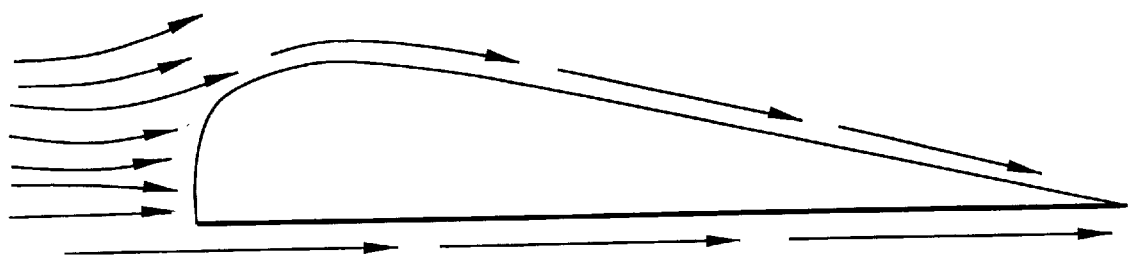
FIG. 21 is a graphical representation of the Bernoulli effect to achieve lift on a conventional airfoil.

My first use of the airfoil was in a windmill. From research, I have perfected the shape to perform better than any other airfoil. This is a slow speed high lift foil and what makes it unique is it is a two-stage lifting device. A conventional airfoil, such as the NACA 0012, uses the Bernoulli effect to achieve lift. See FIG. 21.

Figure 22:
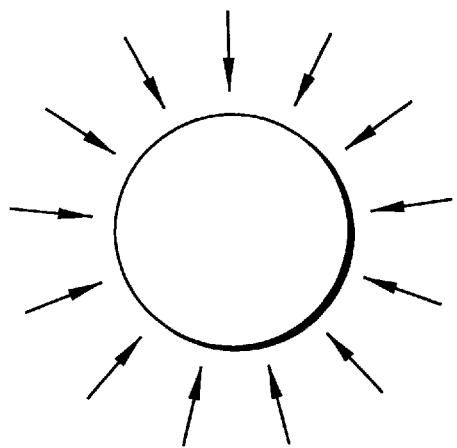
FIG. 22 is a graphical representation of atmospheric pressure on an object at a standstill.

Atmospheric pressure presses equally from all sides on an object at a standstill. See FIG. 22.

Figure 23:
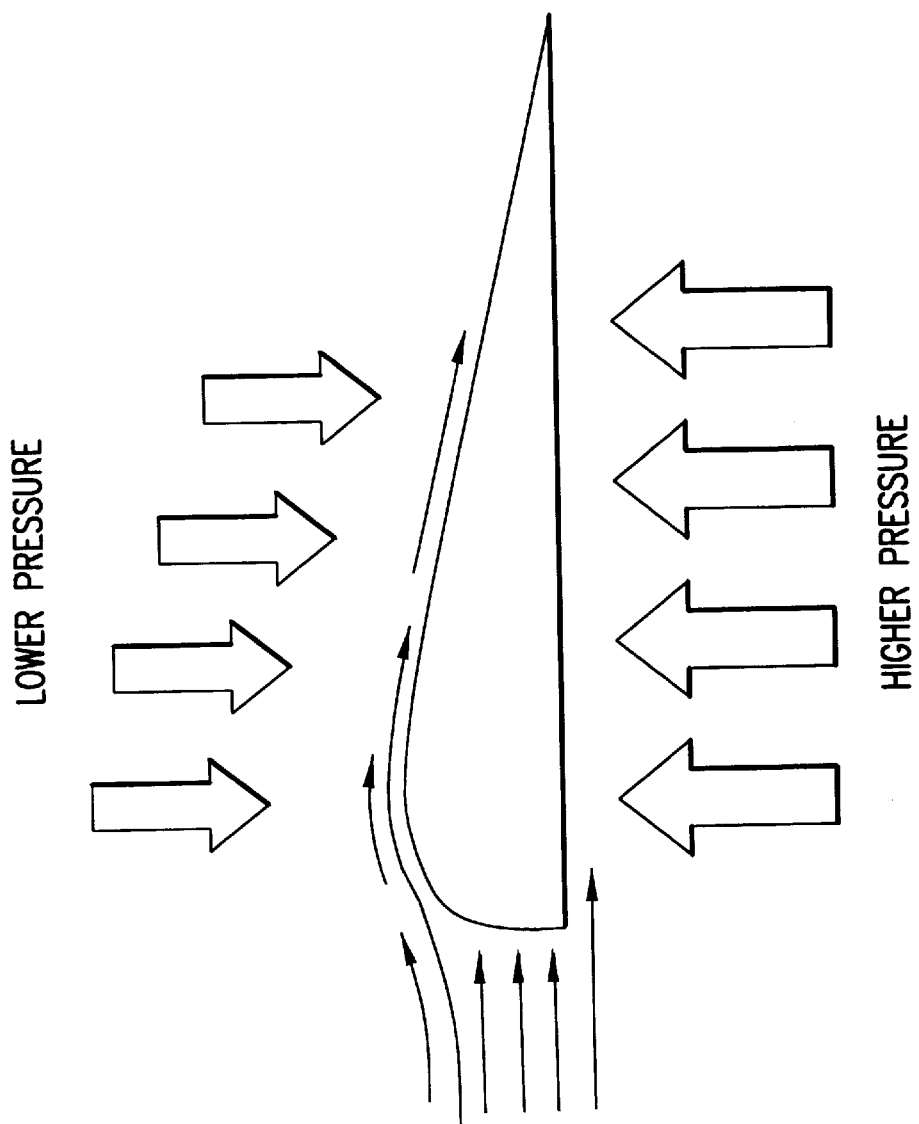
FIG. 23 is a lift diagram.

But a wing cheats. Air moving over an object makes the atmospheric pressure lower on the object. A wind speeds air up onto the top of the wing faster than the air under the bottom of the wing, so atmospheric pressure on the top of the wing is produced allowing the wing to be lifted by the higher pressure under wing. See FIG. 23.

Figure 24:
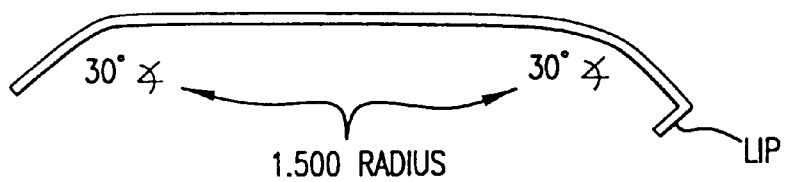
FIG. 24 is a end view of an airfoil in accordance with my invention.

Now, the same wing when flown close to the ground experiences a thing called ground effects, which is a two-stage lift effect. The air over the top of the wing is accelerated and the atmospheric pressure is lowered. But under the wing, the oncoming air is sandwiched between the under side of the wing and the ground, and this boosts atmospheric pressure higher than the pressure on an object at a standstill, therefore, increasing the lift. This is how birds skim effortlessly over water. I have made a wing which produces this "ground effect" at any altitude or attitude. The two-stage lift wing is a refined product of years of testing. FIG. 24 shows one example of how it works.

Figure 25:
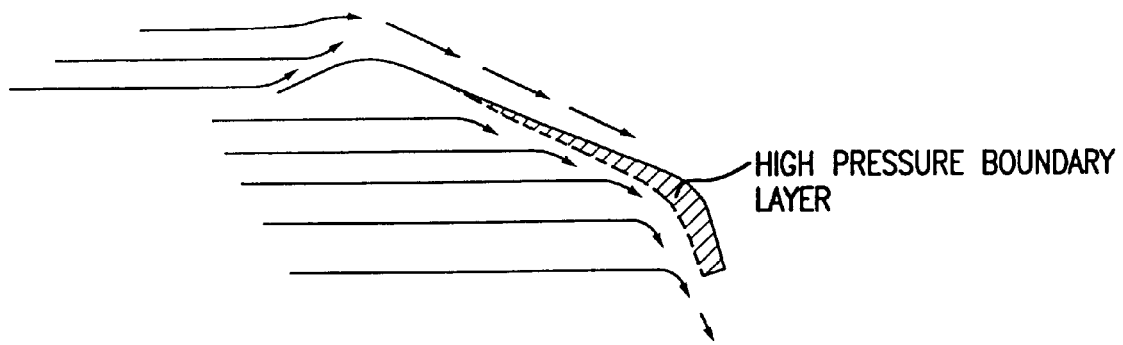
FIG. 25 is a graphical representation of the high pressure boundary layer experienced in air flow passing an airfoil in accordance with my invention.

These dimensions can be scaled up or down without affecting performance; if it is scaled equally. In flight, the air over the top of the wing is accelerated and pressure on top of the wing is reduced. The bottom of the wing is a bit more complex. See FIG. 25.

Figure 26:
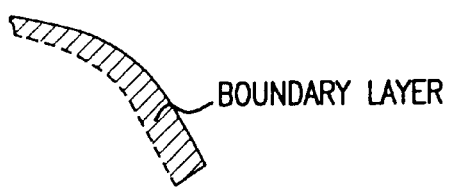
FIG. 26 is a graphical representation of a portion of the boundary layer as shown in FIG. 25.

The air under my foil hits the trailing edge lip causing a pressurized boundary layer to build up under the last three quarters of chord length. This boundary layer extends to the tip of the trailing edge lip. See FIG. 26.

The trailing edge lip is determined by the speed the foil is going through the air. Slower speeds need a longer lip and faster speeds need a smaller lip. The speed of the air compresses the boundary layer, and it, in turn, pushes back on the air flowing under the wing. It acts like an air bearing or an air hockey table and puck. The pressurized boundary layer pushes the oncoming air away from the bottom of the wing surface and beyond the trailing edge lip, so the trailing edge lip does not become a drag factor. Therefore, drag is not increased. In fact, drag is decreased. Also, the pressurized boundary layer is higher than atmospheric pressure, so the lift is more than doubled compared to the NACA 0012.

Angle of attack is critical on the windmill because the airfoil is designed to produce maximum torque at 50° and in strong winds. This angle speeds the mill up to a maximum rpm. Then the airfoil becomes very inefficient because, at that speed, the pressurized boundary layer is compressed below the trailing edge lip and drag on the foil goes way up, slowing the rotation of the mill. Mechanical brakes are common on windmills and require a fair amount of maintenance. If a failure occurs, the mill and people around it are in danger, due to over spin. My windmill needs no brake and is safer.

As for noise, my blades are silent, due to the low rpm. No tip noise can be heard from the ground.

As for diameter, my windmill develops twice the torque of conventional mills which means it can be made to a much smaller diameter and still generate the same horsepower.

My fan blade is similar in appearance to the windmill foil, but is very different in action. The overall dimensions are the same, except the trailing edge lip is smaller in length. Because of the higher speeds of revolutions per minute (rpms) a fan produces, there are no endcaps on the fan. When in motion, the blade draws air into the tips enhancing the total flow of the fan. Angle of attack is not so important. A range was found from 15° of attack to 20° of attack. Performance stays the same, but there is an rpm difference. 20° turns less rpm than 15°. Over all, the fan spins slower than all the prior art fans, producing more flow in cubic feet per minute (cpm) and less noise. Also, the fan produces a huge amount of thrust which no one is using in the fan business. Most fan companies put their fan inside a venturi-shaped bell mouth with an exterior louver attached. With the power on, the fan spins and builds up a pressure between the fan and the louver blades. The bell mouth is needed at this point to keep the pressurized air in this space. As the pressure builds, the blades of the louver open to vent pressure. But gravity wants to shut them, so an equilibrium is reached where pressure opens the blades to the point where the fan can produce. This is not fully open and the fan is taxed to not only move air, but also to make pressure to open louvers so air can move. My fan box uses thrust from the fan which is not normally used to open the louvers fully. There is no bell mouth to restrict fan tips from breathing, and fan flow is considerably increased. Also, my fan box has a linkage bar with knee lock action when the power is off, so one cannot open the louvers by hand to break and enter a building after hours.

FIGS. 4, 5, 6, 7 and 8 show a fan and damper assembly. The following chart shows the test results from this structure.

| # of Blades | Fan Type | Angle of Attack | FPM | Avg. FRM | Area | CFM | RPM | AMPS Legs 1 2 3 | | Volt. AC | Watts | CFM Per Watt | Fan Dia. | Louver Size | Notes |
|---|---|---|---|---|---|---|---|---|---|---|---|---|---|---|---|
| 2 | MAF Hand made blades 20°   30° ½ HP motor LE      TE | 20° | 1.717 1.801 1.770 | 1.762 | 5.08 | 8.954 | 1140 | 1.98  2.09 1.95 2.20 | | 215 | 439 | 20.39 | 24" | Cold Motor | 10/27/97 Sunny 68° F. |
| 2 | MAF Hand made blades 20°   30° ½ HP motor LE      TE | | 1.783 1.782 1.791 | 1.785 | 5.08 | 9.067 | 1140 | 2.18  2.01 1.90 1.95 | | 215 | 432 | 20.99 | 24" | After 3 Min. Running | 10/27/97 Sunny 68° F. |

-continued

| # of Blades | Fan Type | Angle of Attack | FPM | Avg. FRM | Area | CFM | RPM | AMPS Legs 1 2 3 | | | Volt. AC | Watts | CFM Per Watt | Fan Dia. | Louver Size | Notes |
|---|---|---|---|---|---|---|---|---|---|---|---|---|---|---|---|---|
| 2 | MAF | 15° | 1.635 | 1.633 | 5.08 | 8.295 | 1140 | 1.50 | 1.56 | | 210 | 329 | 25.21 | 24" | | 10/28/97 |
| | ⅓ HP Daton motor | | 1.657 | | | | | 1.55 | | | | | | | | Sunny 65° F. |
| | New extrusion | | 1.609 | | | | | 1.65 | | | | | | | | |
| 2 | MAF | 18° | 1.632 | 1.645 | 5.08 | 8.358 | 1140 | 1.45 | 1.58 | | 210 | 332 | 25.17 | 24" | | 10/28/97 |
| | ⅓ HP Daton motor | | 1.668 | | | | | 1.60 | | | | | | | | Sunny 65° F. |
| | New extrusion | | 1.636 | | | | | 1.70 | | | | | | | | |

The ⅓ HP is at 25.21 CFM per watt. The prior art per the AMCA Directory of Agricultural Products with certified ratings is 14.8 CFM per watt at 6280 CFPM, based upon a 24-inch nominal diameter Aerotech, Inc., Advantage AT24ZC, Model HF3L068.

Figure 8:
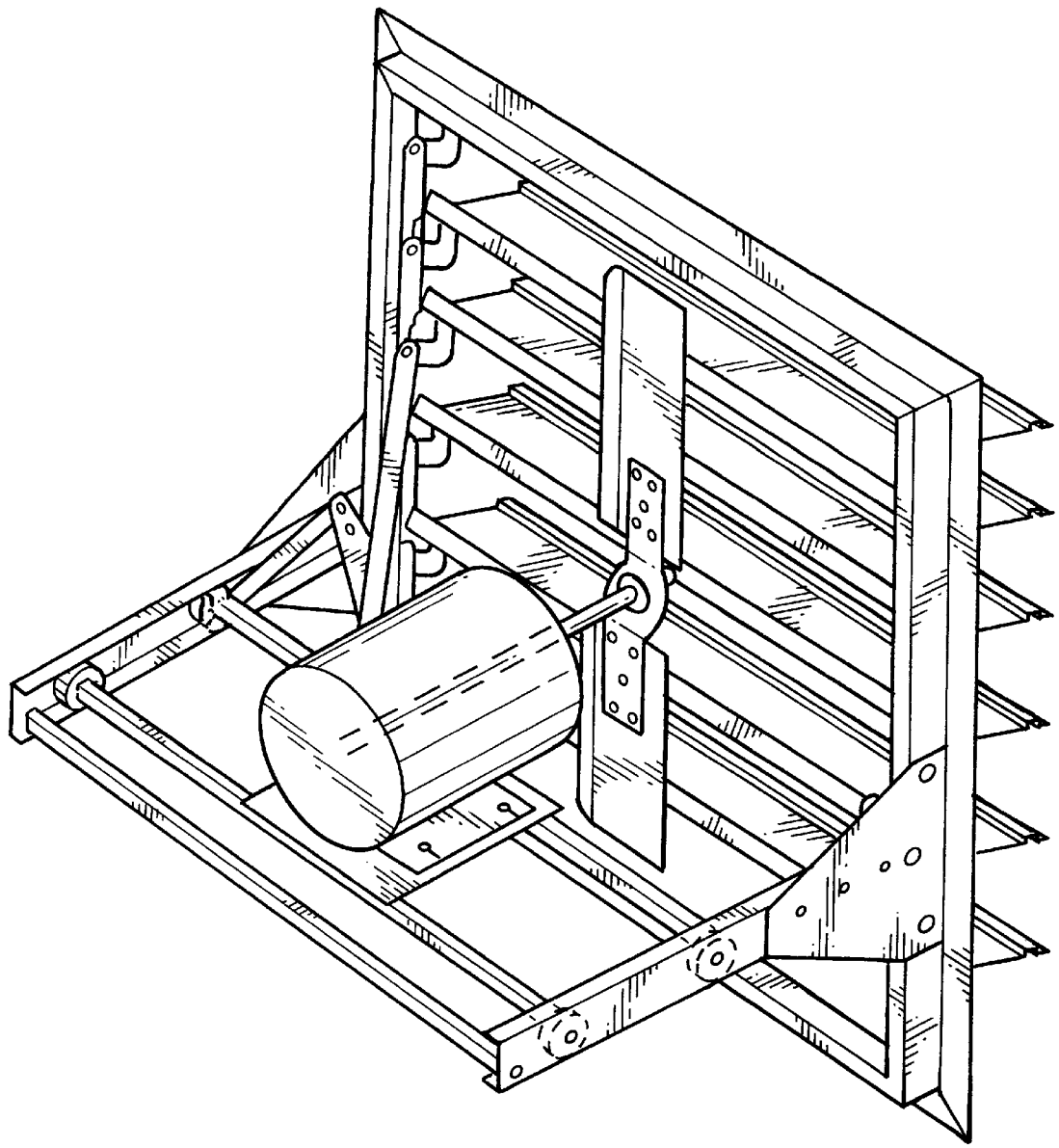
FIG. 8 is a perspective view of a damper fan assembly.

| PERFORMANCE DATA FOR STRUCTURES SHOWN IN FIG. 8 | | | | | | | Wall Opening | | | | | |
|---|---|---|---|---|---|---|---|---|---|---|---|---|
| Model Size | A Square Dimension | B | C | D Fan Dia. | E Std. | Std. Fan | Wire Guard | Ship Weight | HP | CFM* | Velocity* | CFM/ Watt* |
| 3824 | 28" | 21¾" | 1¾" | 24" | 8" | 28¼" | 28½" | # | ⅓ | # | # | # |
| | | | | | | | | | ½ | # | # | # |
| 3832 | 36" | 21¾" | 1¾" | 32" | 8" | 36¼" | 36½" | # | ½ | # | # | # |
| | | | | | | | | | ¾ | # | # | # |
| 3842 | 46" | 21¾" | 1¾" | 42" | 8" | 46¼" | 46½" | # | ¾ | # | # | # |
| | | | | | | | | | 1 | # | # | # |

In addition, I have observed that the shallower the angle, the more the blade acts as a normal air plane wing. There is greater pressure below the wing, causing lift. When the angle gets to approximately 32°, more air is trapped; particularly, because of the back angled flange and there is greater thrust upward. Normally, a wing will stall at 30°; here, the lift continues even to 45°.

It is theorized that a stagnant film is created which provides lubrication and therefore reduces drag. Because of this, it deflects 80° down a wide stream of air, unlike airfoils which deflect 15° and much less air stream. Therefore, it aids the lift. It has produced over double the NACA shape. My latest test results are shown in FIGS. 19 and 27.

In an airfoil design, the distance across the concave area is a "chord", so that air travels further across the convex area than the concave area.

Webster defines an airfoil as follows:

"a body (as an airplane wing or propeller blade) designed to provide a desired reaction force when in motion relative to the surrounding air." (emphasis added). Webster's Third New International Dictionary, G. & C. Merriam Co., Springfield, Mass. (1976), at p. 46.

Basically, an airfoil is a shape which produces lift. It can be a propeller as well as an impeller. The accepted definition is that it builds up pressure underneath rather than negative pressure on the top. In my structure, I dam it up. Ordinarily, an airfoil goes 15° to 26°. Then it stalls. It is no longer working as an airfoil. I can start lower and go further from 7° to 45°.

My propeller can use two, three or four blades without affecting performance. I use a scaled up airfoil with two changes. Two 30° ends are for a propeller shape, not a big radius like the fan or windmill. Also, the trailing edge lip is a very low due to the rpm increase. When talking about propellers, one the biggest factors is "tip" noise. On conventional propellers, the tip speed sometimes exceeds the speed of sound and that is where all the noise comes from. My 60"two-blade propeller was tested against a 60"Sensenich wood propeller for an air boat and I found the Sensenich propeller took 1960 rpms to produce 200 pounds of thrust, and was very noisy. My two blade 60" propeller produced 200 pounds of thrust at 1000 rpm with the same amount of power going into both propellers. Thus, my propeller is quieter and safer with less wear and tear on equipment.

What I claim is:

1. Means for creating a lubricating film of air to reduce drag in an airfoil for use in a flowing air stream, said airfoil having a shape comprising an intermediate face portion and leading and trailing longitudinal edge portions associated with opposite edges of the face portion to form, in cross-section, an essentially pan-shaped structure having a convex surface and a concave surface when disposed with its leading edge facing into the flow of air, which means comprises a flange portion extending at an angle of approximately 90 degrees from the trailing edge portion back toward the leading edge portion on the concave side.

2. The means of claim 1 wherein the airfoil is of substantially uniform thickness.

3. A device having a plurality of airfoils, each of said airfoils having a means for creating a lubricating film of air to reduce drag on the airfoil when in use in a flowing air stream, each of said airfoils having a shape comprising an intermediate face portion and leading and trailing longitudinal edge portions associated with opposite edges of the face portion to form, in cross-section, an essentially pan-shaped structure having a convex surface and a concave surface when disposed with its leading edge facing into the flow of air, and further comprising a flange portion extending at an angle of approximately 90 degrees from the trailing edge portion back toward the leading edge portion on the concave side, each airfoil positioned in said device at a range of angles approximately 7° to 45° to the direction of air flow through said device.

4. A device as in claim 2 wherein each airfoil is positioned substantially radially to the direction of the air flow, said direction of air flow being axial.

5. The device of claim 2 wherein said airfoils are of substantially uniform thickness.

6. A method of creating a lubricating film of air to reduce drag in an airfoil for use in a flowing air stream, said airfoil having a shape comprising an intermediate face portion and leading and trailing longitudinal edge portions associated with opposite edges of the face portion to form, in cross-section, an essentially pan-shaped structure having a convex surface and a concave surface when disposed with its leading edge facing into the flow of air, comprising providing a flange portion extending at an angle of approximately 90 degrees from the trailing edge portion back toward the leading edge portion on the concave side.

7. The method of claim 4 wherein the airfoil is of substantially uniform thickness.

* * * * *